(12) United States Patent
Inoue et al.

(10) Patent No.: US 10,382,178 B2
(45) Date of Patent: *Aug. 13, 2019

(54) METHOD FOR MULTIPLEXING CONTROL SIGNALS AND REFERENCE SIGNALS IN MOBILE COMMUNICATIONS SYSTEM

(71) Applicant: NEC CORPORATION, Tokyo (JP)

(72) Inventors: Takamichi Inoue, Tokyo (JP); Yoshikazu Kakura, Tokyo (JP)

(73) Assignee: NEC CORPORATION, Minato-ku, Tokyo (JP)

(*) Notice: Subject to any disclaimer, the term of this patent is extended or adjusted under 35 U.S.C. 154(b) by 107 days.

This patent is subject to a terminal disclaimer.

(21) Appl. No.: 15/612,422

(22) Filed: Jun. 2, 2017

(65) Prior Publication Data

US 2017/0272215 A1    Sep. 21, 2017

Related U.S. Application Data

(63) Continuation of application No. 15/240,042, filed on Aug. 18, 2016, now Pat. No. 9,692,570, which is a
(Continued)

(30) Foreign Application Priority Data

Sep. 29, 2006    (JP) .................................. 2006-267765

(51) Int. Cl.
| | |
|---|---|
| *H04L 5/00* | (2006.01) |
| *H04L 1/16* | (2006.01) |
| *H04B 7/216* | (2006.01) |
| *H04W 72/04* | (2009.01) |
| *H04J 13/00* | (2011.01) |

(Continued)

(52) U.S. Cl.
CPC ............. *H04L 5/005* (2013.01); *H04B 7/216* (2013.01); *H04J 13/0062* (2013.01); *H04L 1/1671* (2013.01); *H04L 5/0016* (2013.01); *H04L 5/0053* (2013.01); *H04L 5/0092* (2013.01);
(Continued)

(58) Field of Classification Search
None
See application file for complete search history.

(56) References Cited

U.S. PATENT DOCUMENTS

| | | |
|---|---|---|
| 5,943,329 A | 8/1999 | Ohgoshi et al. |
| 8,228,936 B2 | 7/2012 | Inoue et al. |

(Continued)

FOREIGN PATENT DOCUMENTS

| | | |
|---|---|---|
| CN | 1389039 A | 1/2003 |
| EP | 1521415 A2 | 4/2005 |

(Continued)

OTHER PUBLICATIONS

"Physical Layer Aspects for Evolved UTRA", 3GPP TSG RAN, Feb. 2006, v1.1.1, 84 pages.
(Continued)

*Primary Examiner* — James P Duffy
(74) *Attorney, Agent, or Firm* — Sughrue Mion, PLLC

(57) ABSTRACT

A reference signal multiplexing method for multiple mobile stations includes: grouping together control signals for the multiple mobile stations; and multiplexing reference signals corresponding to the control signals by CDM over the same bandwidth as that of grouped control signals.

58 Claims, 14 Drawing Sheets

Related U.S. Application Data continuation of application No. 14/645,515, filed on Mar. 12, 2015, now Pat. No. 9,445,414, which is a continuation of application No. 13/543,319, filed on Jul. 6, 2012, now Pat. No. 9,008,110, which is a continuation of application No. 11/862,607, filed on Sep. 27, 2007, now Pat. No. 8,228,936.

(51) Int. Cl.
*H04L 27/26* (2006.01)
*H04L 1/00* (2006.01)

(52) U.S. Cl.
CPC ....... *H04L 27/2628* (2013.01); *H04W 72/042* (2013.01); *H04L 1/0026* (2013.01)

(56) References Cited

U.S. PATENT DOCUMENTS

| | | | |
|---|---|---|---|
| 9,008,110 | B2 | 4/2015 | Inoue et al. |
| 9,445,414 | B2 | 9/2016 | Inoue et al. |
| 9,692,570 | B2 * | 6/2017 | Inoue ............... H04L 1/1671 |
| 2001/0012276 | A1 | 8/2001 | Tsunehara et al. |
| 2002/0154616 | A1 | 10/2002 | Aoyama et al. |
| 2004/0235472 | A1 | 11/2004 | Fujishima et al. |
| 2005/0141446 | A1 | 6/2005 | Niwano |
| 2006/0116080 | A1 | 6/2006 | Eom |
| 2007/0070956 | A1 | 3/2007 | Seki |
| 2007/0183386 | A1 * | 8/2007 | Muharemovic ......... H04L 5/023 370/344 |

FOREIGN PATENT DOCUMENTS

| | | | |
|---|---|---|---|
| JP | 62-092529 A | | 4/1987 |
| JP | 2001-292474 A | | 10/2001 |
| JP | 2006-505230 A | | 2/2006 |
| WO | WO 2005/125020 | * | 12/2005 ............... H04B 1/00 |

OTHER PUBLICATIONS

"Reference Signal Multiplexing for EUTRA uplink", 3GPP TSG RAN WG1 Meeting #46 Aug. 28-Sep. 1, 2006 8.4.2., 8 pages.
"Reference Signal Multiplexing for EUTRA Uplink", 3GPP TSG RAN WG1 Meeting #47 Nov. 6-10, 2006, 6.4.2, 7 pages.
"Reference Signal Structure for EUTRA Uplink", 3GPP TSG-RAN WG1 Meeting #44bis, Mar. 27-31, 2006, 10.2.1, 6 pages.
3GPP, R1-051062, Texas Instruments, "On Uplink Pilot in EUTRA SC-FDMA," Oct. 2005.
3GPP, R1-060388, Motorola, "Performance Comparison of Pilot/Reference Signal Structures for E-UTRA Uplink SC-FDMA," Feb. 2006.
3GPP, Technical Specification Group Radio Access Network; Physical layer aspects for evolved Universal Terrestrial Radio Access (UTRA) (Release 7) "TR 25.814 v7.0.0," Section 9.1.1. pp. 1-7 and 67-70.
Chinese Office Action dated Mar. 1, 2012 issued in China Application No. 200710162420.X.
Communication from the European Patent Office dated Jul. 24, 2012 in counterpart European Application No. 07075852.9.
NTT Docomo et al: "Multiplexing Method of Shared Control Channel in Uplink Single-Carrier FDMA Radio Access", Internet Citation, Oct. 10, 2005 (Oct. 10, 2005), XP002450609, Retrieved from the Internet: URL:http://www.3gpp.org/ftp/tsg_ran/WG1_RL1/TSGR1_42bis/Docs/R1-051143.zip.
Partial European Search Report from the European Patent Office dated Sep. 20, 2011 in the corresponding European Patent Application No. 07075852.9.
Popvic, B.M., "Generalized Chirp-Like Polyphase Sequences with Optimum Correlation Properties," IEEE Transactions on Information Theory, vol. 38, No. 4 (Jul. 1992), pp. 1406-1409).
Communication dated Jan. 17, 2019 from the European Patent Office in application No. 18190586.0.

* cited by examiner

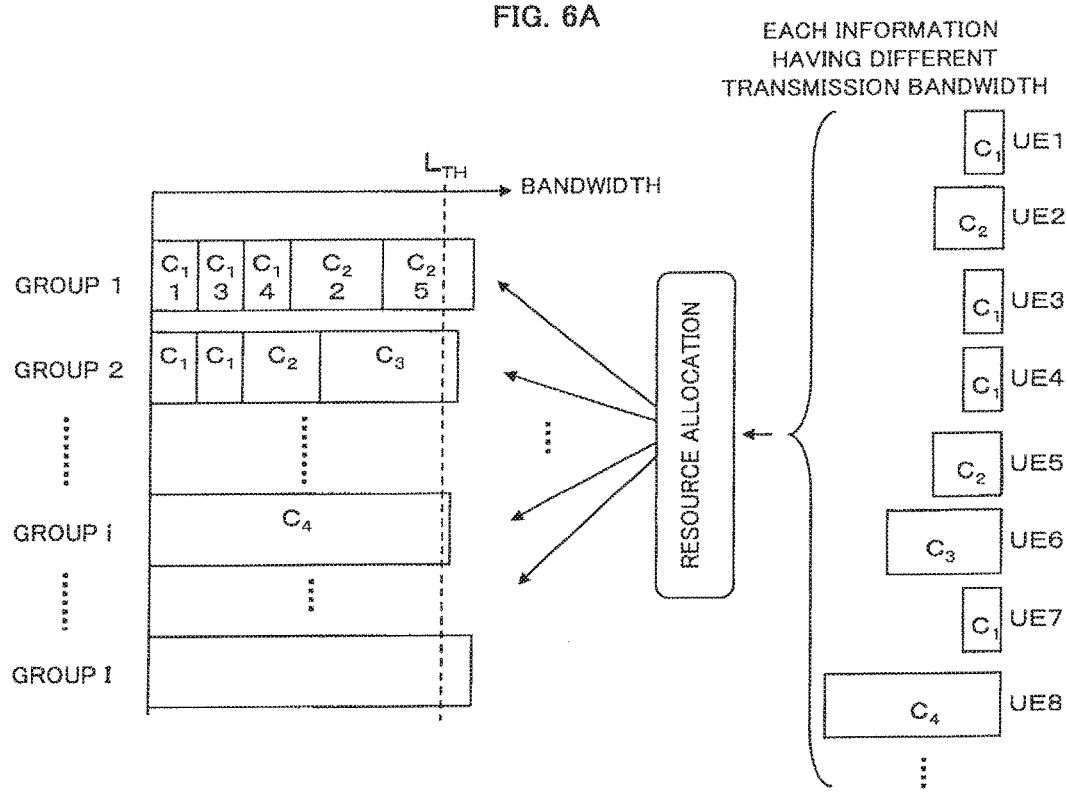
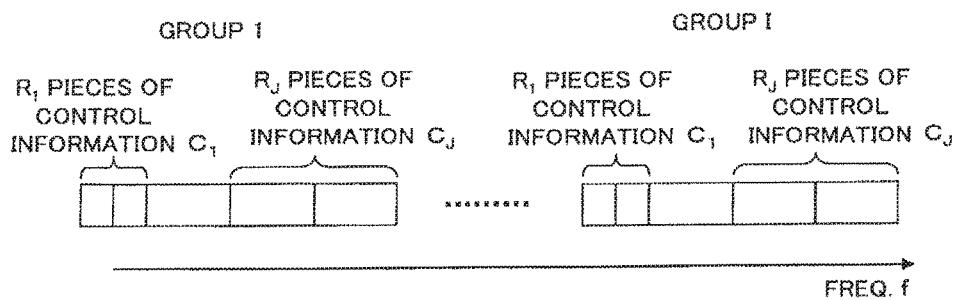

FIRST EXEMPLARY EMBODIMENT

SECOND EXEMPLARY EMBODIMENT

THIRD EXEMPLARY EMBODIMENT

METHOD FOR MULTIPLEXING CONTROL SIGNALS AND REFERENCE SIGNALS IN MOBILE COMMUNICATIONS SYSTEM

CROSS REFERENCE TO RELATED APPLICATIONS

This application is a continuation of U.S. application Ser. No. 15/240,042 filed Aug. 18, 2016, which is a continuation application of U.S. application Ser. No. 14/645,515 filed on Mar. 12, 2015, which issued as U.S. Pat. No. 9,445,414 on Sep. 13, 2016, which is a continuation of U.S. application Ser. No. 13/543,319 filed on Jul. 6, 2012, which issued as U.S. Pat. No. 9,008,110 on Apr. 14, 2015, which is a continuation of U.S. application Ser. No. 11/862,607 filed on Sep. 27, 2007, which issued as U.S. Pat. No. 8,228,936 on Jul. 24, 2012, and claims priority from Japanese Patent Application No. 2006-267765, filed on Sep. 29, 2006, the disclosures of which are incorporated by reference herein in their entirety.

BACKGROUND OF THE INVENTION

The present invention relates to a mobile communications system and, more particularly, to a method for multiplexing control signals and reference signals (also referred to as pilot signals), a method for allocating resources, and a base station using the resource allocation method.

DESCRIPTION OF THE RELATED ART

In the Third Generation Partnership Project (3GPP), standardization of Long Term Evolution (LTE), so-called 3.9G, is currently progressing. In LTE, single-carrier transmission is considered as an uplink access scheme. It can be said that the single-carrier transmission is an access scheme excellent for power efficiency in comparison with multi-carrier transmission, such as orthogonal frequency division multiplexing (OFDM), because the peak-to-average power ratio (PAPR) can be kept low. Hence, it can be said that the single-carrier transmission is an access scheme suitable for uplink.

FIG. 1A is a diagram showing a frame format for uplink supported by LTE, which is described in 3GPP, "TR 25.814 v7.0.0," Section 9.1.1. In LTE, communication is performed in units of a frame (also referred to as a sub-frame) of a time length of 0.5 msec. One frame includes six long blocks LB#1 to LB#6 and two short blocks SB#1 and SB#2, with a cyclic prefix (CP) added to each block, which will be described later. The time length of a long block is set to be twice as long as that of a short block, and the number of subcarriers in a long block is set to be twice as large as that in a short block. In addition, a subcarrier interval in a long block is set to be half a subcarrier interval in a short block.

Note that although two short blocks are provided here, the number of short blocks, which are allocated for reference signals, depends on the length of a frame, an allowable overhead, and the like. Moreover, as for the timings of the short blocks SB#1 and SB#2 in a frame, the structure shown in FIG. 1A is not limitative, and it suffices to determine the timings so as to allow the reference signals to function effectively.

CAZAC (Constant Amplitude Zero Auto-Correlation) sequence is a predominant one of the sequences used for uplink reference signals. For example, Zadoff-Chu sequence is one type of the CAZAC sequence, represented by the following equation (see Popvic, B. M., "Generalized Chirp-Like Polyphase Sequences with Optimum Correlation Properties," IEEE Transactions on Information Theory, Vol. 38, No. 4 (July 1992), pp. 1406-1409):

$$c_k(n) = \begin{cases} \exp\left[\frac{j2\pi k}{L}\left(\frac{n^2}{2}+n\right)\right] & \text{when the sequence length } L \text{ is an even number} \\ \exp\left[\frac{j2\pi k}{L}\left(n\frac{n+1}{2}+n\right)\right] & \text{when the sequence length } L \text{ is an odd number} \end{cases}$$

where n=0, 1, . . . , and L−1, and k is a sequence number, which is an integer prime to L.

The CAZAC sequence is a sequence that makes the amplitude of a signal constant in time and frequency domains and that allows the autocorrelation value to be zero at a phase difference of any value other than zero. Because of the constant amplitude in time domain, PAPR can be kept low, and because of the constant amplitude in frequency domain as well, the CAZAC sequence is suitable for channel estimation in frequency domain. Moreover, because of the property of perfect autocorrelation, the CAZAC sequence also has the advantage of being suitable to detect the timing of a received signal. For these reasons, the CAZAC sequence has been attracting attention as a sequence suitable for single-carrier transmission. However, in the case of the CAZAC sequence, there is a limit to the number of sequences that can be obtained. The number of sequences depends on the sequence length. In the case of the Zadoff-Chu sequence, the number of sequences reaches it peak when the sequence length L is a prime number, and the maximum number of sequences is equivalent to (L−1).

In uplink, it is necessary that each mobile station (hereinafter, also expressed as UE) transmit a reference signal. Therefore, a variety of methods for multiplexing reference signals of multiple UEs have been proposed.

In 3GPP, R1-051062, Texas Instruments, "On Uplink Pilot in EUTRA SC-FDMA," October 2005, code division multiplexing (CDM) is proposed as a multiplexing method employed when the CAZAC sequence is used for uplink reference signals.

FIG. 1B is a schematic diagram for describing a method for allotting a CAZAC sequence to a reference signal of each UE. In code-division-multiplexing of reference signals, UEs use CAZAC sequences of the same length, and each UE is assigned a CAZAC sequence having a unique cyclic prefix added thereto as shown in FIG. 1B. If the time length of this cyclic prefix is set to be not shorter than a maximum delay time supposed, then the reference signals of all the UEs can be orthogonalized even in multi-path environments. This is because the autocorrelation value of a CAZAC sequence is always zero except when the phase difference is zero. Note, however, that there is a limit on the number of UEs that can be multiplexed by CDM with respect to reference signal. In a current LTE system, the number of UEs that can be multiplexed is six or so (see 3GPP, R1-060388, Motorola, "Performance Comparison of Pilot/Reference Signal Structures for E-UTRA Uplink SC-FDMA," February 2006).

An uplink control signal can be classified as any one of a data-dependent control signal (also referred to as a data-associated control signal), which is a control signal regarding uplink data, and a data-independent control signal (also referred to as a data-non-associated control signal), which is feedback information regarding a downlink signal. The data-dependent control signal is a signal transmitted when uplink data is present. If a data-dependent control signal is transmitted by using a resource (long block LB) for transmitting a data signal, an essentially required reference signal (transmitted by using a short block SB) for demodulating the data signal can also be utilized to demodulate the data-dependent control signal.

On the other hand, the data-independent control signal is a signal transmitted as a feedback on downlink data, or the like, and is a signal transmitted independently of an uplink data signal. Accordingly, a reference signal for demodulating the data-independent control signal is required, and the problem of how to allocate a resource for the reference signal arises.

In the foregoing, data-dependent and data-independent control signals have been described with respect to uplink control signal. However, with respect to downlink control signal as well, it can be said that a control signal transmitted when downlink data is present (a data-dependent control signal, which is a control signal regarding downlink data) is a downlink data-dependent control signal, and that a signal transmitted independently of a downlink data signal (a data-independent control signal, which is feedback information regarding an uplink signal) is a downlink data-independent control signal. Hereinafter, to simplify expression, it is assumed that a "control signal" indicates a "data-independent control signal."

Examples of control information, which is contained in an uplink data-independent control signal, at least include Acknowledgment/Negative Acknowledgment (hereinafter, expressed as Ack/Nack) indicating whether or not downlink information has been received without errors, channel quality indication information (channel quality indicator: hereinafter, expressed as CQI) indicating the state of a downlink channel, a combination of these, and the like. It is desirable that Ack/Nack be transmitted at every transmission time interval (hereinafter, expressed as TTI). However, with the transmission overhead being considered, it is not always necessary to transmit CQI at every TTI. For this reason, there are some occasions when the frequency of transmission of Ack/Nack differs from the frequency of transmission of CQI. Accordingly, within a TTI, UEs transmitting three types of control signals may coexist: a UE transmitting Ack/Nack only, a UE transmitting CQI only, and a UE transmitting both of Ack/Nack and CQI. Incidentally, TTI is a time interval equivalent to a set of multiple blocks (also referred to as a transport block set) transported at a time between the physical and MAC layers.

However, the amount of information of Ack/Nack is smaller than that of CQI. It is possible to make transmission bandwidths of the above-mentioned three types of control signals constant by changing the rate of encoding, or transmitting dummy bits. However, if these transmission bandwidths are made constant, waste occurs with a resource (transmission bandwidth) used to transmit a signal having a small amount of information. To avoid the occurrence of such waste of resource, frequency resources (transmission bandwidths) allocated to transmit the respective control signals are, in general, different transmission bandwidths of three types.

In addition, the transmission made by a UE simultaneously transmitting Ack/Nack and CQI is multi-carrier transmission if corresponding control resources are mapped in uncontiguous frequency bands, resulting in increased PAPR. Accordingly, in order for a UE simultaneously transmitting Ack/Nack and CQI to make single-carrier transmission, resources in adjacent frequency bands need to be allocated to the UE, and these signals need to be processed together. This will be described more specifically with reference to FIGS. 2A and 2B.

FIG. 2A is a diagram showing frequency resource allocation in the case of multi-carrier transmission of control signals, and FIG. 2B is a diagram showing frequency resource allocation in the case of single-carrier transmission of control signals. Referring to FIG. 2A, when control resources in uncontiguous frequency bands F1 and F2 are allocated to a UE which simultaneously transmits Ack/Nack and CQI, the UE cannot perform single-carrier transmission. Accordingly, PAPR is increased as described above.

Therefore, the frequency resources for transmitting Ack/Nack and CQI are mapped into a combined band of adjacent frequency bands F3 and F4 as shown in FIG. 2B, whereby these bands can be handled as a single band, enabling single-carrier transmission.

FIG. 3 is a diagram showing an example of the allocation of resources for control and reference signals. Here, shown is the case, as an example, where control signals in a long block LB#1 and reference signals in a short block SB#1 are time-division-multiplexed (TDM). Incidentally, a numeral applied to each control or reference signal in the drawing represents a UE's number (the same goes for the other drawings.)

As to the control signals regarding downlink data signals, there are three types of UEs coexisting, each transmitting Ack/Nack only, CQI only, or both of Ack/Nack and CQI, as described above. Here, UEs 1 and 6 each transmit both of Ack/Nack and CQI, UEs 2 and 3 each transmit Ack/Nack only, and UEs 4 and 5 each transmit CQI only.

However, according to a conventional resource allocation method, a reference signal is allocated a reference resource in the same bandwidth which a control signal to be demodulated is transmitted in. That is, reference resources each corresponding to three types of transmission bandwidths are to be allocated. Therefore, a reference signal for demodulating Ack/Nack, which has a small amount of information and hence a small transmission bandwidth, also has a reduced transmission bandwidth. Since the length of the CAZAC sequence, which is used for reference signals, depends on the transmission bandwidth as described above, the number of usable reference signal sequences (CAZAC sequences) decreases when Ack/Nack only is transmitted.

However, the number of reference signal sequences is an important factor to the cell designing in a cellular system composed of multiple cells. The reason is that the use of the same reference signal sequence by adjacent cells leads to increased interference between the cells, and to avoid this, adjacent cells need to use different reference signal sequences. According to the conventional resource allocation method, as described above, if a transmission bandwidth is small as in the case of Ack/Nack, the length of the usable CAZAC sequence is short. Therefore, the problem arises that there occurs a shortage of the sequences to be used for reference signals at the time of transmission.

SUMMARY OF THE INVENTION

An object of the present invention is to provide a multiplexing method and a resource allocation method that can ensure the number of code sequences for reference signals for control signal demodulation.

According to the present invention, a method for multiplexing reference signals for a plurality of mobile stations, comprising: grouping together control signals for the plurality of mobile stations; and multiplexing reference signals corresponding to the control signals by CDM (code-division multiplexing) over a same bandwidth as that of grouped control signals.

According to the present invention, reference signals of multiple UEs are code-division-multiplexed over the same bandwidth as that of grouped control signals. Thereby, the number of code sequences for reference signals used for control signal demodulation can be ensured.

BRIEF DESCRIPTION OF THE DRAWINGS

FIG. 6A is a schematic diagram showing an example of the grouping of control resources according to the present invention.

FIG. 6B is a schematic diagram showing the generalized grouping of control resources according to the present invention.

DETAILED DESCRIPTION OF THE PREFERRED EMBODIMENTS

1. System

Figure 4:
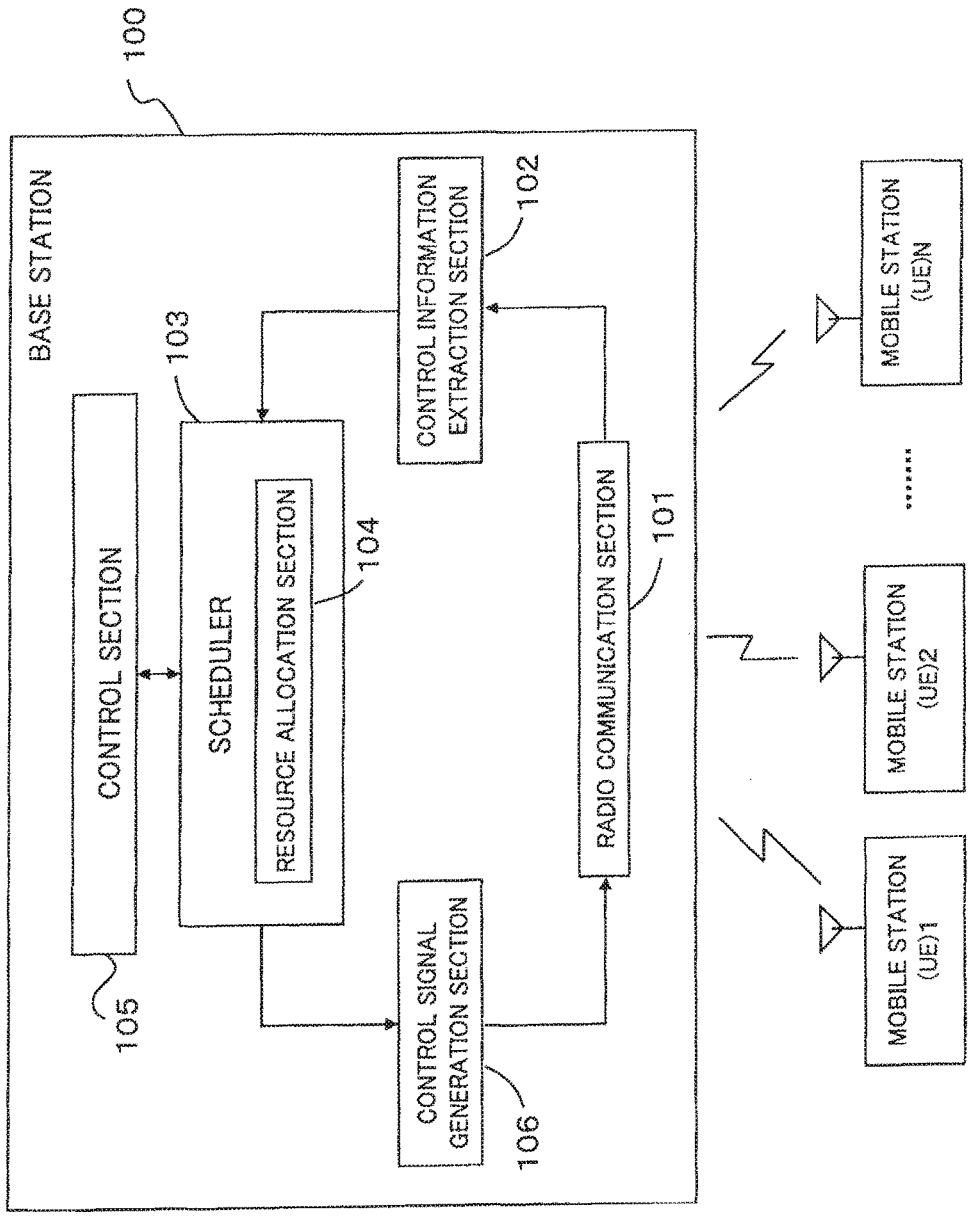
FIG. 4 is a block diagram showing a schematic configuration of a base station to implement the present invention.

FIG. 4 is a block diagram showing a schematic configuration of a base station to implement the present invention.

A base station 100 includes a radio communication section 101, which demodulates an uplink control signal and/or uplink data signal received from mobile stations (UEs) in accordance with corresponding reference signals similarly received, and which outputs the control signals to a control information extraction section 102. Here, a "resource" means a frequency-time region specified by the frequency band and time period required to transmit a signal. Moreover, a resource to be allocated to a control signal is referred to as a control resource, and a resource to be allocated to a reference signal is referred to as a reference resource.

The control information extraction section 102 extracts information, such as a request for uplink resource allocation from a mobile station here, and outputs the information to a scheduler 103. The scheduler 103 includes a resource allocation section 104 that executes control resource allocation and reference resource allocation, which will be described later. Additionally, although not shown in the drawing, the base station 100 also includes a memory area for storing information about past resource allocation, another scheduler that executes downlink resource allocation, and a CQI measurement section that measures CQI based on an uplink reference signal received by the radio communication section 101. The resource allocation section 104 acquires the information about past resource allocation held in the memory area, information about the presence or absence of downlink data to be sent to each mobile station from the scheduler that executes downlink resource allocation, CQI of each mobile station from the CQI measurement section, and the like. Based on these pieces of information, the resource allocation section 104 generates resource allocation information including resource allocation for each mobile station and its multiplexing scheme, and outputs the resource allocation information to a control signal generation section 106. Here, the multiplexing scheme is information indicative of any one of localized frequency division multiplexing (LFDM) and distributed frequency division multiplexing (DFDM), as a method of multiplexing control signals.

The control signal generation section 106 generates a control signal containing the resource allocation information for each mobile station and transmits the control signal to each mobile station through the radio communication section 101. Here, it is assumed that the resource allocation information includes information about which frequency band (hereinafter, also referred to as frequency resource) at which time (or in which block: hereinafter, also referred to as time resource) is allocated to which mobile station.

Incidentally, the base station 100 is provided with a control section 105 that controls the operations of the base station. Resource management by the scheduler 103 is performed under the control of the control section 105. In general, the control section 105 performs various controls, such as resource allocation control, by executing control programs on a program-controlled processor such as a CPU. The scheduler 103 and resource allocation section 104 can also be implemented by executing respective programs on the same program-controlled processor or on a separate program-controlled processor.

Figure 5:
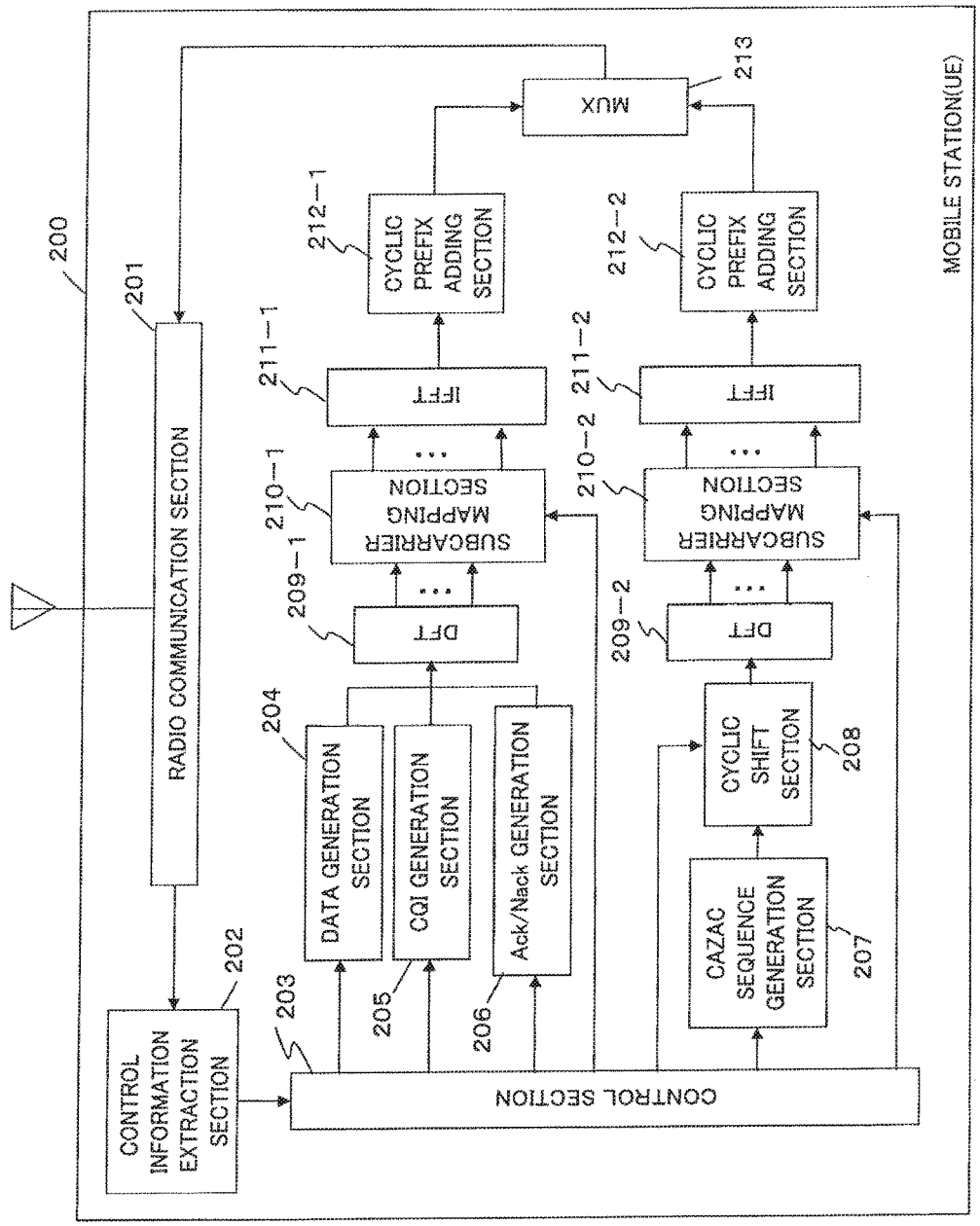
FIG. 5 is a block diagram showing a schematic configuration of a mobile station (UE) to implement the present invention.

FIG. 5 is a block diagram showing a schematic configuration of a mobile station (UE) to implement the present invention. A mobile station 200 includes a radio communication section 201, which demodulates a downlink control signal and/or downlink data signal received from the base station 100 by using corresponding reference signals similarly received, and which outputs the control signal to a control information extraction section 202. The control information extraction section 202 extracts resource allocation information and outputs it to a control section 203.

First, in accordance with the resource allocation information, the control section 203 individually controls a data generation section 204, a CQI generation section 205, an Ack/Nack generation section 206, a CAZAC sequence generation section 207, and a cyclic shift section 208 so that these sections generate respective signals at respective timings according to the time resource allocation information. Further, the control section 203 individually controls a subcarrier mapping section 210-1 for control and data signals and a subcarrier mapping section 210-2 for reference signals.

The data signal and/or control signal generated by the data generation section 204, CQI generation section 205, and/or Ack/Nack generation section 206 are transformed into frequency-domain signals by a discrete Fourier transform (DFT) section 209-1, and the respective frequency-component signals in the frequency domain are outputted to the subcarrier mapping section 210-1. The subcarrier mapping section 210-1 determines, in accordance with the frequency resource allocation information from the control section 203, which subcarriers to be used to transmit the signals inputted from the DFT section 209-1 (subcarrier mapping). For example, in accordance with the frequency resource allocation information from the control section 203, the subcarrier mapping section 210-1 can perform subcarrier mapping by means of localized frequency division multiplexing (LFDM) using contiguous subcarriers, or subcarrier mapping by means of distributed frequency division multiplexing (DFDM) using subcarriers spaced at fixed intervals.

The frequency-domain signals subjected to subcarrier mapping by the subcarrier mapping section 210-1 are transformed into time-domain signals by an inverse fast Fourier transform (IFFT) section 211-1 before a cyclic prefix adding section 212-1 adds cyclic prefixes (CPs) to the time-domain signals.

As for the reference signal, the CAZAC sequence generation section 207 generates a CAZAC sequence as a reference signal in accordance with the resource allocation information from the control section 203. The cyclic shift section 208 cyclic-shifts the CAZAC sequence by an amount of time length unique to each mobile station as described with reference to FIG. 1B and outputs the resultant CAZAC sequences to a DFT section 209-2. The operations of the DFT section 209-2, the subcarrier mapping section 210-2, an IFFT section 211-2, and a cyclic prefix adding section 212-2 are similar to those in the case of the data signal and/or control signal described above, and therefore a description thereof will be omitted.

The data signal and/or control signal thus outputted from the cyclic prefix adding section 212-1 and the reference signal thus outputted from the cyclic prefix adding section 212-2 are time-division-multiplexed (TDM) by a multiplexer section (MUX) 213, and the multiplex signal is transmitted to the base station 100 through the radio communication section 201.

In the system configuration described above, the allocation of resources and the multiplexing of control and reference signals according to embodiments of the present invention are performed, which will be described next in detail.

2. Resource Allocation by Grouping Together

A basic concept of the present invention is that reference signals of multiple mobile stations (UEs) are code-division-multiplexed (CDM) in a bandwidth that is obtained by grouping together the transmission bandwidths of control signals to be transmitted by the multiple mobile stations. Hereinafter, such a bandwidth obtained by the grouping is referred to as a total bandwidth. An example of the grouping of control signals will be described.

FIG. 6A is a schematic diagram showing an example of the grouping of control resources according to the present invention, and FIG. 6B is a schematic diagram showing the generalized grouping of control resources according to the present invention. Here, it is assumed that grouping is performed so that I groups are formed at the maximum, wherein each group i is a group of control resources that meets limiting conditions undermentioned.

For simplicity, it is assumed that, as shown in FIG. 6A, there are pieces of control information $C_1$ to $C_4$ having different transmission bandwidths to be transmitted by UEs 1 to 8. Here, the "pieces of control information having different transmission bandwidths" are those which have different amounts of information and which are individually contained in control signals to be transmitted by UEs. In this case, the resource allocation section 104 of a base station, while taking account of the bandwidth of the control information of each mobile station, forms a group i such that the total bandwidth is not smaller than a target bandwidth (hereinafter, referred to as a target $L_{TH}$, which is expressed in the length of a corresponding sequence) and that a limiting condition regarding the total number of multiplexed UEs is satisfied. The resource allocation section 104 then carries out resource allocation for the UEs that transmit the pieces of control information grouped.

For example, GROUP 1 is formed by grouping together the pieces of control information $C_1$ of the UEs 1, 3, and 4 and the pieces of control information $C_2$ of the UEs 2 and 5 so that the total bandwidth of these pieces of control information is not smaller than a bandwidth equivalent to the target $L_{TH}$ and that the limiting condition regarding the total number of multiplexed UEs is satisfied. Incidentally, in GROUP 1 as shown in FIG. 6A, the numerals under "$C_1$" and "$C_2$," which represent control information, indicate corresponding UEs.

Based on the thus formed GROUP 1, one frequency band is made in which the bands of the control signals are collected. The pieces of control information of the other UEs that are not included in GROUP 1 are subjected to grouping similarly, to be included in any of the next GROUP 2 and subsequent GROUPs. Additionally, if a single piece of control information meets the condition that the total bandwidth is not smaller than the target $L_{TH}$, a group may be composed of this piece of control information only. In this example, GROUP i in FIG. 6A includes only the control information $C_4$ of the UE 8.

Another example of the method for grouping such multiple pieces of control information having difference transmission bandwidths will be described hereafter. Here, it is assumed that a setting is made such that, as shown in FIG. 6B, each GROUP i can include multiple types of control information $C_1, C_2, \ldots, C_J$ having different transmission bandwidths, in maximum numbers of $R_1, R_2, \ldots, R_J$, respectively, so that the condition regarding the total bandwidth and the limiting condition regarding the total number of multiplexed UEs are both satisfied. In the case of this example, the numbers of control resources to be allocated for the respective types of control information $C_j$ in each GROUP i, $R_j$, are fixed at the same number. Here, "J" is the number of types of control information having different amounts of information that are individually contained in control signals to be transmitted by UEs. Assuming that there are two types of control information, "Ack/Nack" and "CQI", as in the example described earlier, control information that is selected and transmitted by each UE is of any one of the following three types: "Ack/Nack," "CQI," and "Ack/Nack+CQI." Since these three (J=3) types of control information have different amounts of information, they correspond to pieces of control information $C_1$ to $C_3$ having difference transmission bandwidths. Accordingly, $R_1$ to $R_3$ are upper limits, respectively, for the number of pieces of control information $C_1$, the number of pieces of control information $C_2$, and the number of pieces of control information $C_3$ when they are mapped to each GROUP i.

As an example, it is assumed that, with J=3, a setting is made such that $R_1$=3, $R_2$=2, and $R_3$=1, for groups 1 to I. UEs are mapped to GROUPs 1 to I, in order of the types of control information as in FIG. 6A (specifically, in the order: $C_1$, $C_2$, and $C_3$). First, the UEs 1, 3, 4, and 7 transmitting control information $C_1$ are mapped to GROUPs, starting from GROUP 1. Since $R_1$=3, the UEs 1, 3, and 4 are mapped to GROUP 1, and the UE 7 is mapped to the next GROUP 2. In this manner, with respect to every type of control information, the UEs can be sequentially mapped to GROUPs.

Thus, control signals for multiple UEs are grouped so that the total bandwidth of the grouped control signals is not smaller than a fixed transmission bandwidth. Based on this total bandwidth of the grouped control signals, corresponding reference signals are multiplexed by CDM.

Figure 7:
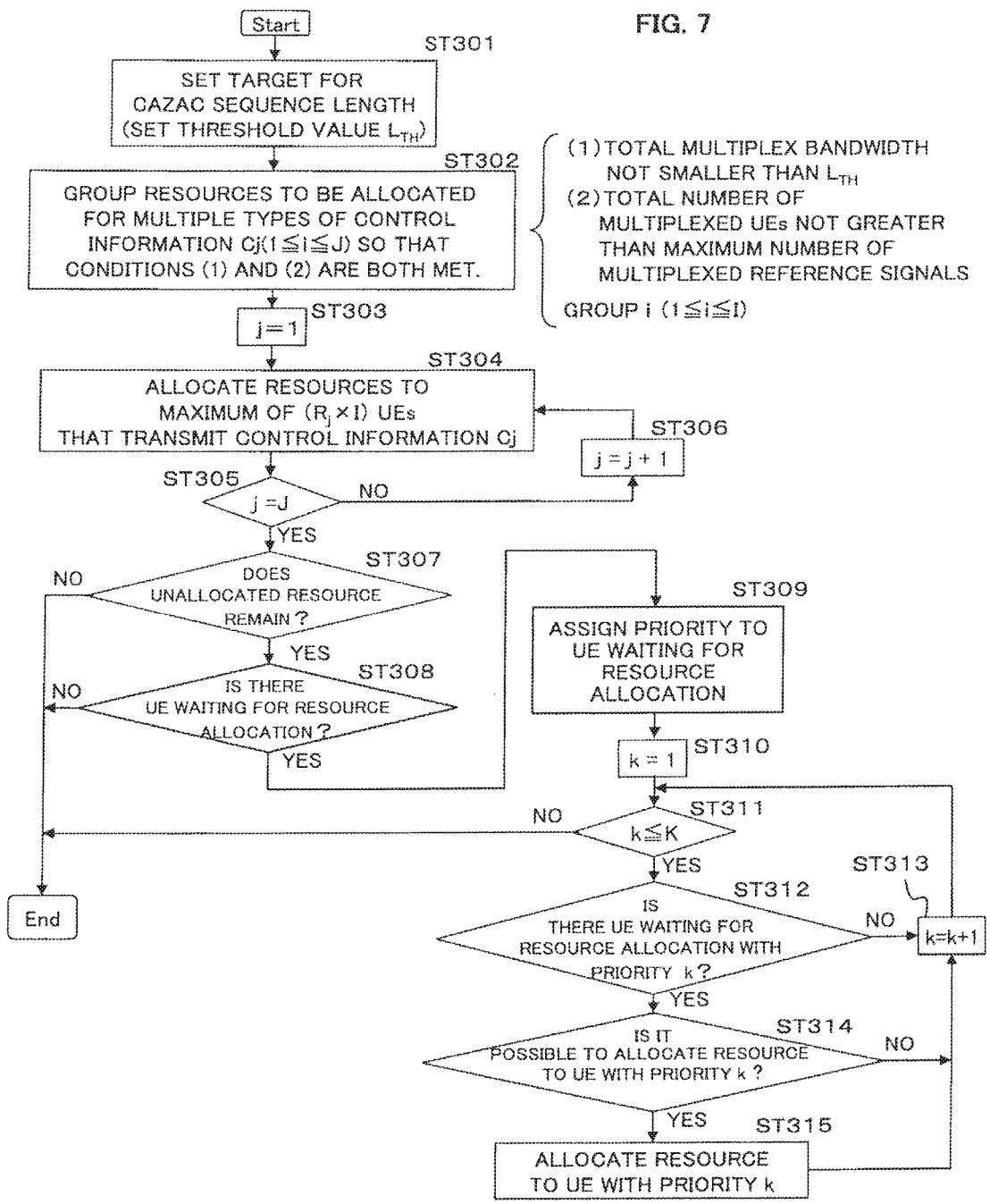
FIG. 7 is a flowchart showing an example of a resource allocation method according to the present invention.

FIG. 7 is a flowchart showing an example of a resource allocation method according to the present invention. First, the resource allocation section 104 of a base station sets a target $L_{TH}$, which is a CAZAC sequence length (ST301). The target $L_{TH}$ can be obtained based on the number of sequences required in a system. For example, if twelve CAZAC sequences are required, the target $L_{TH}$ is 13. If nine CAZAC sequences are required, the target $L_{TH}$ is 11.

Subsequently, the resource allocation section 104 groups together resources to be allocated for multiple types of control information $C_j$ (1≤j≤J) so that the following two conditions are both satisfied (ST302).

Condition 1) The total multiplex bandwidth of grouped control signals is not smaller than the target $L_{TH}$.

Condition 2) The total number of multiplexed UEs is not larger than the maximum number of reference signals that can be multiplexed.

Here, it is assumed that "I" is the number of groups formed, and that each group includes $R_j$ control resources for transmitting control information $C_j$ (see FIG. 6B).

Next, j is initialized to 1 (ST303), and the control resource for transmission of control information $C_j$ (here, control information $C_1$) is allocated to UEs, in each group (ST304). Taking the case described with reference to FIG. 6B as an example, the control resources for the control information $C_j$ are allocated to a maximum of ($R_j$×I) UEs in this step ST304. The processing in the step ST304 is repeated while j is incremented each time, until j reaches a maximum value of J (ST305, ST306). In this manner, the pieces of control information of the multiple UEs are grouped and mapped to the control resources in a collective frequency band.

Subsequently, the resource allocation section 104 determines whether or not an unallocated control resource remains (ST307). When no unallocated control resource remains (ST307: NO), the processing is terminated. When there remains an unallocated control resource (ST307: YES), the resource allocation section 104 determines whether or not there is a UE to which a resource could not be allocated in the above-described processing steps ST304 to ST306 (ST308). When such a UE waiting for resource allocation is present (ST308: YES), the resource allocation section 104 assigns a degree of priority k (hereinafter, simply referred to as a priority k) to that UE in accordance with undermentioned criteria (ST309), and then carries out resource allocation control in accordance with the priority as described below.

The priority to be assigned to a UE is determined based on the type of control information, the length of time for which the UE has been waiting, and the like. For example, higher priorities are assigned to UEs such as a UE that is to transmit information more susceptible to delay, such as Ack/Nack, and a UE that has been waiting for a longer time. Incidentally, it is assumed that "1" is the highest priority, followed by 2, 3, . . . , and K in descending order of priority.

First, the priority k is initialized to 1 (ST310). When k (here, 1) is not larger than K (ST311: YES), then it is determined whether or not there is a UE waiting for resource allocation with the currently designated priority k (here, 1) (ST312). When such a UE is not present in the step ST312 (ST312: NO), the priority k is incremented (ST313), and then, if k is not larger than K, it is determined whether or not a UE with the new priority k is present (ST312). When such a UE is present in the step ST312 (ST312: YES), it is determined whether or not a resource can be allocated to the UE with the currently designated priority k (ST314). If allocation is impossible (ST314: NO), the control goes back to the step ST313. If allocation is possible (ST314: YES), a resource is allocated to the UE with the currently designated priority k (ST315), and then the control returns to the step ST313. In this manner, the steps ST311 to ST315 are repeated for every priority. When the priority k exceeds K (ST311: NO), the processing is terminated.

3. Multiplexing Scheme

Basic concepts of a multiplexing scheme according to the present invention are as follows.

(1) Control signals for multiple UEs are grouped together and then multiplexed by frequency division multiplexing (FDM).

(2) Reference signals are multiplexed by code division multiplexing (CDM) over the same bandwidth as that grouped control signals for multiple UEs.

Since the reference signals are multiplexed by CDM over the same bandwidth as the total bandwidth of the grouped control signals for multiple UEs, the number of usable CAZAC sequences can be increased.

In accordance with the above-described grouping of control signals, the resource allocation section 104 multiplexes control signals and reference signals by using any one of multiplexing schemes described below.

Figure 8A:
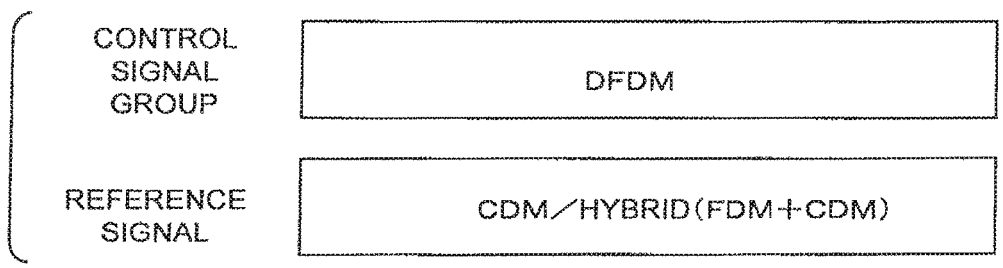
FIGS. 8A to 8C are schematic diagrams showing schemes for multiplexing control and reference signals according to first to third exemplary embodiments of the present invention, respectively.
Figure 8B:
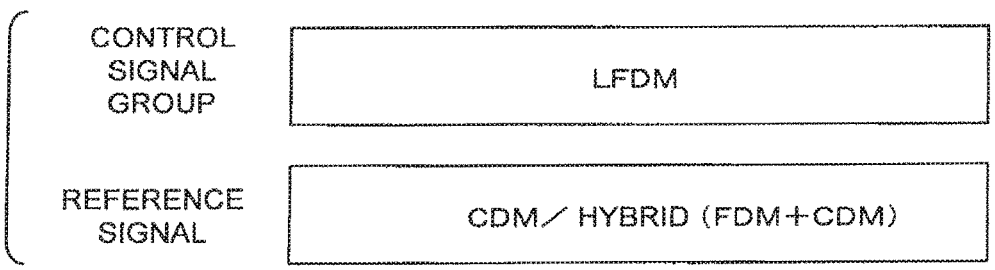
Figure 8C:
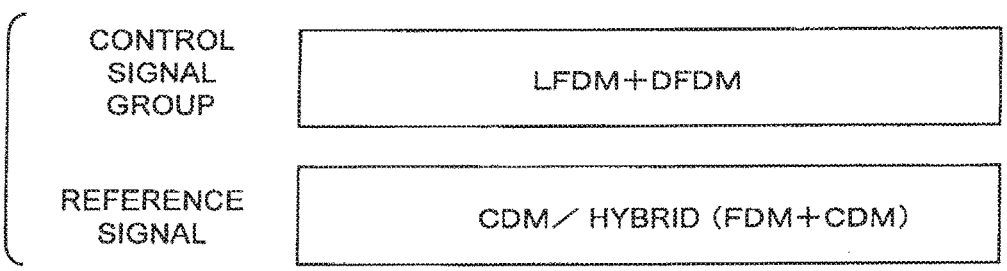

FIGS. 8A to 8C are schematic diagrams showing schemes for multiplexing control and reference signals according to first to third exemplary embodiments of the present invention, respectively.

Referring to FIG. 8A, according to a first exemplary embodiment of the present invention, grouped control signals for multiple UEs are multiplexed by distributed FDM (DFDM), and corresponding reference signals are multiplexed by CDM or by a hybrid of FDM and CDM. In this case, the hybrid of FDM and CDM is a scheme by which reference signals of those UEs over the same bandwidth for transmission are code-division-multiplexed and reference signals of those UEs over different bandwidths for transmission are frequency-division-multiplexed (DFDM). Specific examples will be described later.

Referring to FIG. 8B, according to a second exemplary embodiment of the present invention, grouped control signals for multiple UEs are multiplexed by localized FDM (LFDM), and corresponding reference signals are multiplexed by CDM or by the hybrid of FDM and CDM.

Referring to FIG. 8C, according to a third exemplary embodiment of the present invention, grouped control signals for multiple UEs are multiplexed by LFDM, and then, among groups of such grouped control signals, control signals in those groups over the same bandwidth are multiplexed by DFDM. Corresponding reference signals are multiplexed by CDM or by the hybrid of FDM and CDM.

Hereinafter, assuming that there are two types of control signals having different amounts of information (Ack/Nack and CQI), a description will be given, as an example, of the case where there are three types of bandwidths: a bandwidth for transmitting Ack/Nack only, a bandwidth for transmitting CQI only, and a bandwidth for transmitting both of Ack/Nack and CQI.

4. First Exemplary Embodiment

According to the first exemplary embodiment of the present invention, resource allocation is performed by a base station such that among control signals for multiple UEs, control signals having the same bandwidth are multiplexed by DFDM, and reference signals for those UEs corresponding to the DFDM control signals are multiplexed by CDM over the total bandwidth of the DFDM control signals.

Figure 10:
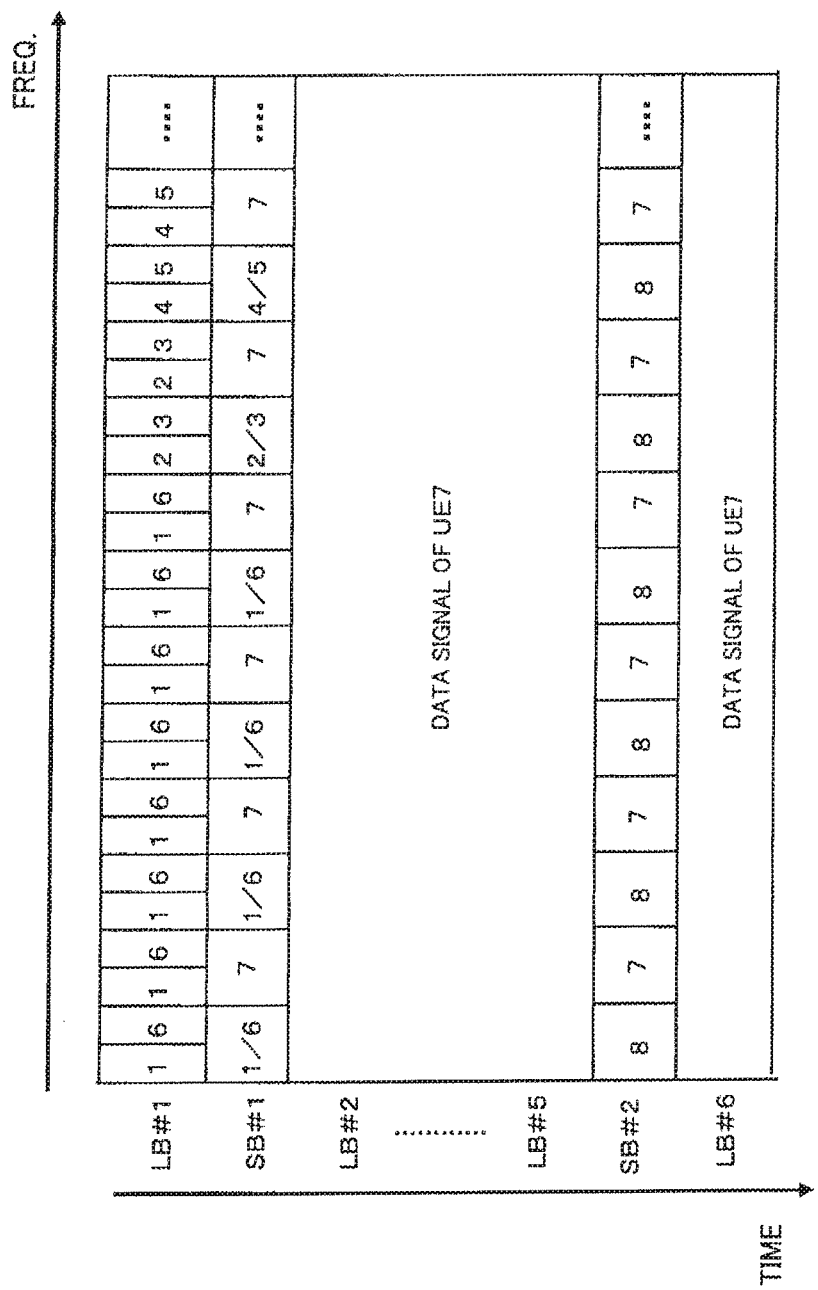
FIG. 10 is a diagram showing another example of the allocation of resources for control and reference signals according to the first exemplary embodiment of the present invention.

Specifically, the resource allocation section 104 acquires information about past resource allocation, information about the presence or absence of downlink data to be sent to each UE, which is acquired from the scheduler performing downlink resource allocation, and the like. Based on these pieces of information, the resource allocation section 104 selects from among multiple types of control information having different amounts of information (here, "Ack/Nack" and "CQI") one type or multiple types of control information (here, any one or both of "Ack/Nack" and "CQI") for each UE, and allocates each UE a bandwidth according to the amount of the selected information. The resource allocation section 104 then generates resource allocation information indicating the allocated bandwidths and also indicating that among the UEs allocated the multiple types of bandwidths, control signals for $M_i$ UEs ($1 \le M_i \le N$, $1 \le i \le I$, $M_1+M_2+ \ldots +M_I=N$) that are allocated the same transmission bandwidth are grouped together to form I groups and are multiplexed by DFDM, and that reference signals for the $M_i$ UEs in each of the I groups are multiplexed by CDM in a reference resource having the same bandwidth as the total bandwidth of the grouped control signals included in the group. The resource allocation information is information as shown in FIG. 10 for example, which will be described later.

4.1) Example 1

Figure 1A:
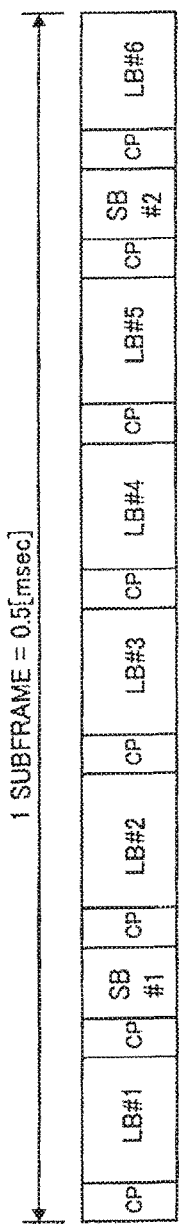
FIG. 1A is a diagram showing a frame format for uplink supported by LTE, described in 3GPP, "TR 25.814 v7.0.0," Section 9.1.1.
Figure 1B:
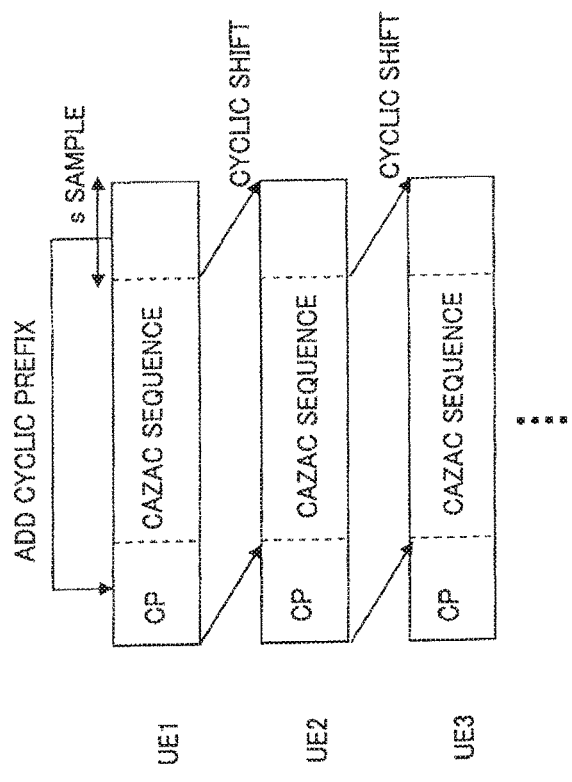
FIG. 1B is a schematic diagram for describing a method for allotting a CAZAC sequence to a reference signal of each UE.
Figure 2A:
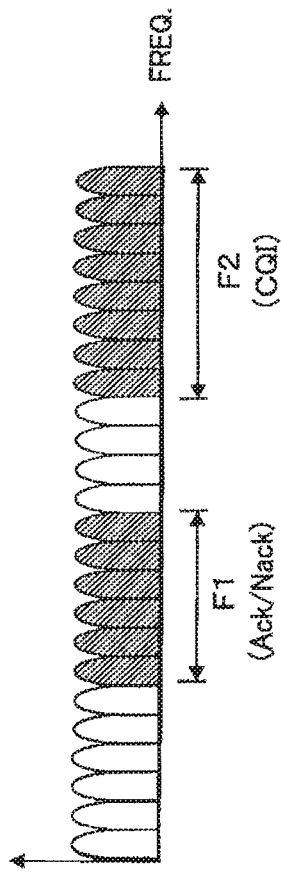
FIG. 2A is a diagram showing frequency resource allocation in the case of multi-carrier transmission of control signals.
Figure 2B:
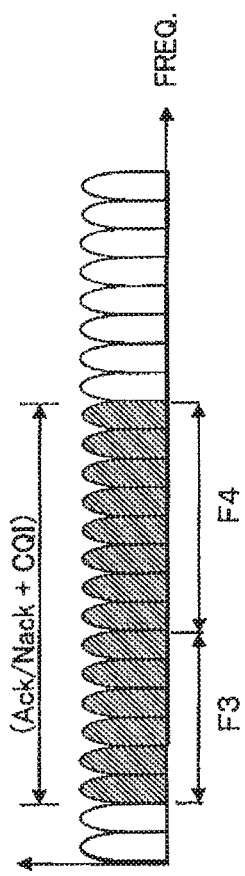
FIG. 2B is a diagram showing frequency resource allocation in the case of single-carrier transmission of control signals.
Figure 9:
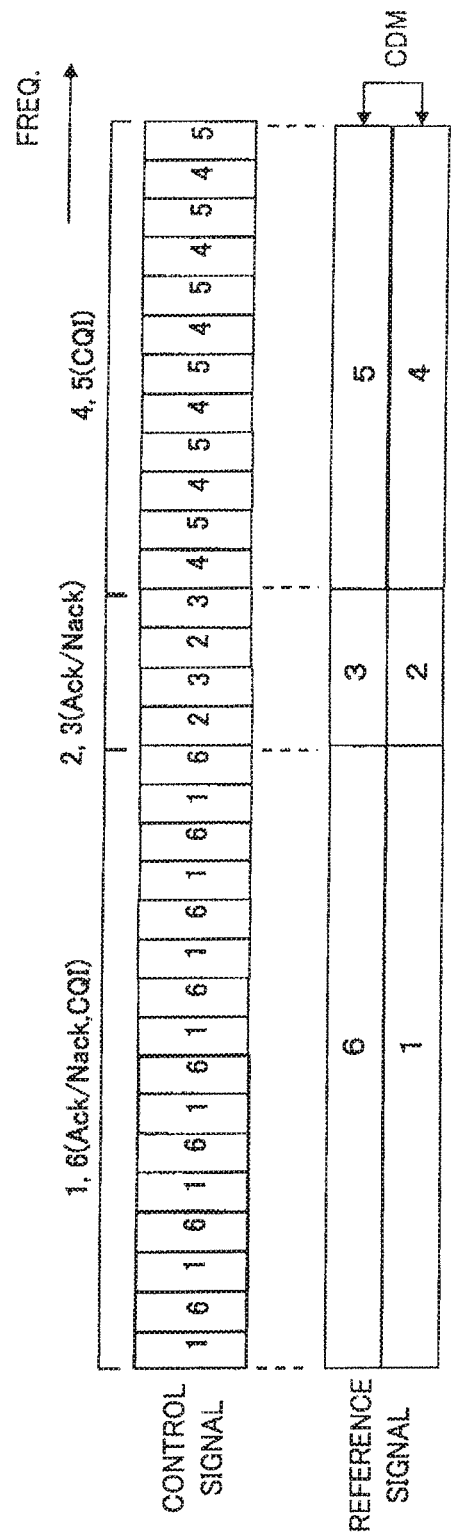
FIG. 9 is a diagram showing an example of the allocation of resources for control and reference signals according to the first exemplary embodiment of the present invention.

FIG. 9 is a diagram showing an example of the allocation of resources for control and reference signals according to the first exemplary embodiment of the present invention. Here, it is assumed that control and reference signals are multiplexed by time division multiplexing (TDM), and that in each sub-frame, data and control signals are transmitted in long blocks (LB) and reference signals are transmitted in short blocks (SB), as shown in FIG. 1A for example.

Specifically, referring to FIG. 9, UEs 1 and 6 are those transmitting both of Ack/Nack and CQI and are multiplexed by DFDM with a repetition factor of 2 over a bandwidth that is twice as wide as a bandwidth for transmitting Ack/Nack and CQI. With respect to reference signals for the UEs 1 and 6, the two UEs are multiplexed by CDM over the bandwidth that is twice as wide as the bandwidth for transmitting Ack/Nack and CQI.

UEs 2 and 3 are those transmitting Ack/Nack only and are multiplexed by DFDM with a repetition factor of 2 over a bandwidth that is twice as wide as a bandwidth for transmitting Ack/Nack. With respect to reference signals for the UEs 2 and 3, the two UEs are multiplexed by CDM over the bandwidth that is twice as wide as the bandwidth for transmitting Ack/Nack.

Similarly, UEs 4 and 5 are those transmitting CQI only and are multiplexed by DFDM with a repetition factor of 2 over a bandwidth that is twice as wide as a bandwidth for transmitting CQI. With respect to reference signals for the UEs 4 and 5, the two UEs are multiplexed by CDM over the bandwidth that is twice as wide as the bandwidth for transmitting CQI.

Figure 3:
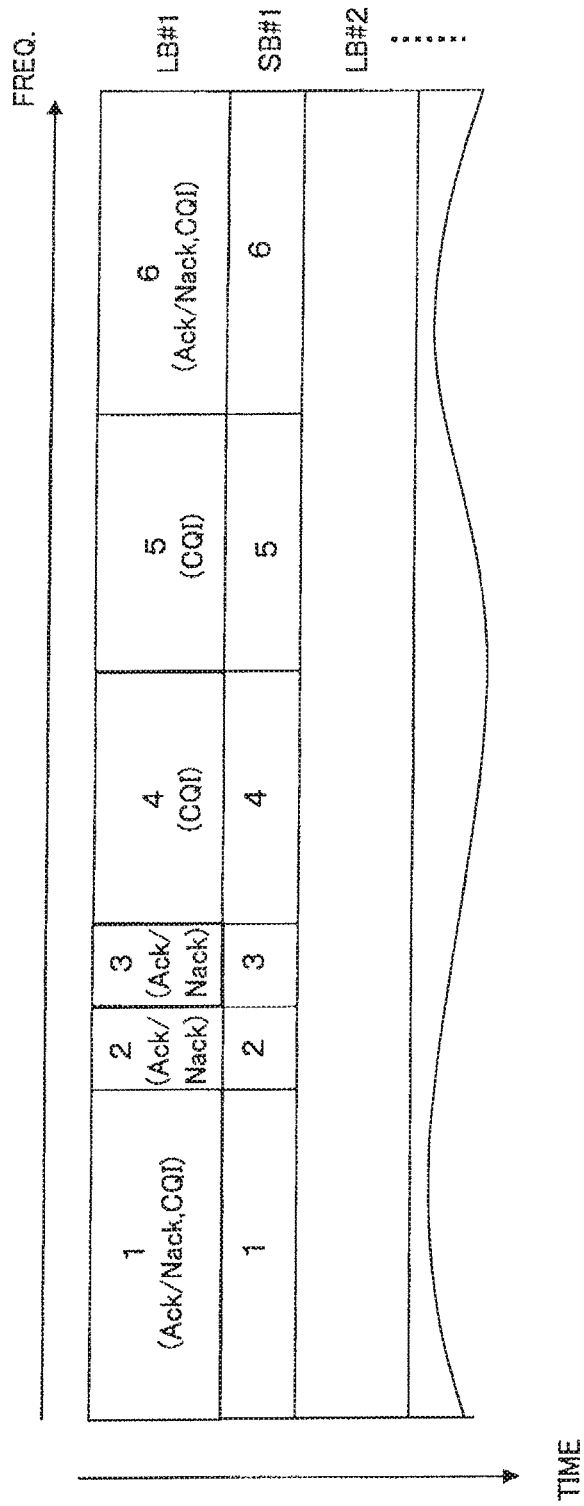
FIG. 3 is a diagram showing an example of the allocation of resources for control and reference signals.

According to the resource allocation of the present example, since the bandwidth for each reference signal is doubled in comparison with those according to the related arts as shown in FIG. 3, the number of CAZAC sequences can be made approximately twice as large. Incidentally, in the case where n UEs are multiplexed by CDM, the number of CAZAC sequences can be made approximately n times larger because the bandwidth of each reference signal is n times wider.

Note that although control and data signals are multiplexed by TDM in the present example, the resource allocation of the present example is similarly applicable in the case where control and data signals are multiplexed by FDM.

4.2) Example 2

FIG. 10 is a diagram showing another example of the allocation of resources for control and reference signals according to the first exemplary embodiment of the present invention. Here, it is assumed that in each sub-frame, control signals are transmitted in a long block LB#1, reference signals are transmitted in short blocks SB#1 and SB#2, and data signals are transmitted in long blocks LB#2 to LB#6, as shown in the LTE's uplink frame format in FIG. 3.

When a data signal is transmitted in long blocks LB#2 to LB#6, a reference signal for demodulating the data signal is transmitted in each of short blocks SB#1 and SB#2. In the present example, in the short block SB#1, a reference signal for a UE 7, which transmits data, is multiplexed by DFDM with, for example, reference signals for control signals for UEs 1 and 6 that are multiplexed by CDM (the hybrid of FDM and CDM). In the short block SB#2, a reference signal for the UE7 is multiplexed by DFDM with a reference signal for CQI measurement of a UE 8. Incidentally, in FIG. 10, UE's numbers shown with "/" between them indicate that these UEs are multiplexed by CDM. The same goes for the other drawings.

Note that although control and data signals are multiplexed by TDM in the present example, the resource allocation of the present example is similarly applicable in the case where control and data signals are multiplexed by FDM.

4.3) Advantages

According to the first exemplary embodiment of the present invention, control signals having the same bandwidth are multiplexed by DFDM, and corresponding reference signals are multiplexed by CDM over the bandwidth where the control signals are multiplexed by DFDM, and then transmitted. Thereby, the reference signal sequence length is made longer as many times as the number of the UEs multiplexed by CDM. Accordingly, the number of CAZAC sequences usable as reference signals can be made larger approximately as many times as the number of the UEs multiplexed by CDM.

5. Second Exemplary Embodiment

According to the second exemplary embodiment of the present invention, reference signals for multiple UEs whose control signals are multiplexed by LFDM, are multiplexed by CDM.

In other words, according to the second exemplary embodiment of the present invention, among multiple types of control information having different amounts of information (here, "Ack/Nack" and "CQI"), one type or multiple types of control information (here, any one or both of "Ack/Nack" and "CQI") is selected for each UE; a bandwidth according to the amount of the selected information is allocated to each UE; control signals for $M_i$ UEs ($1 \le M_i \le N$, $1 \le i \le I$, $M_1 + M_2 + \ldots + M_I = N$) are grouped together to form I groups and are multiplexed by LFDM; reference signals for the $M_i$ UEs in each of the I groups are multiplexed by CDM in a reference resource having the same bandwidth as the total bandwidth of the grouped control signals included in the group.

In the present embodiment, there coexist UEs transmitting three different types of control signals: those transmitting Ack/Nack only, those transmitting CQI only, and those transmitting both of Ack/Nack and CQI. One channel of Ack/Nack and one channel of CQI are grouped. A UE transmitting both of Ack/Nack and CQI is allocated an entire bandwidth obtained by this grouping. A UE transmitting Ack/Nack only and a UE transmitting CQI only share the bandwidth obtained by this grouping and are multiplexed by LFDM. Corresponding reference signals are multiplexed by CDM over the bandwidth obtained by this grouping. Accordingly, in comparison with the methods according to the related arts, it is possible to increase the number of usable CAZAC sequences.

5.1) Example 3

Figure 11:
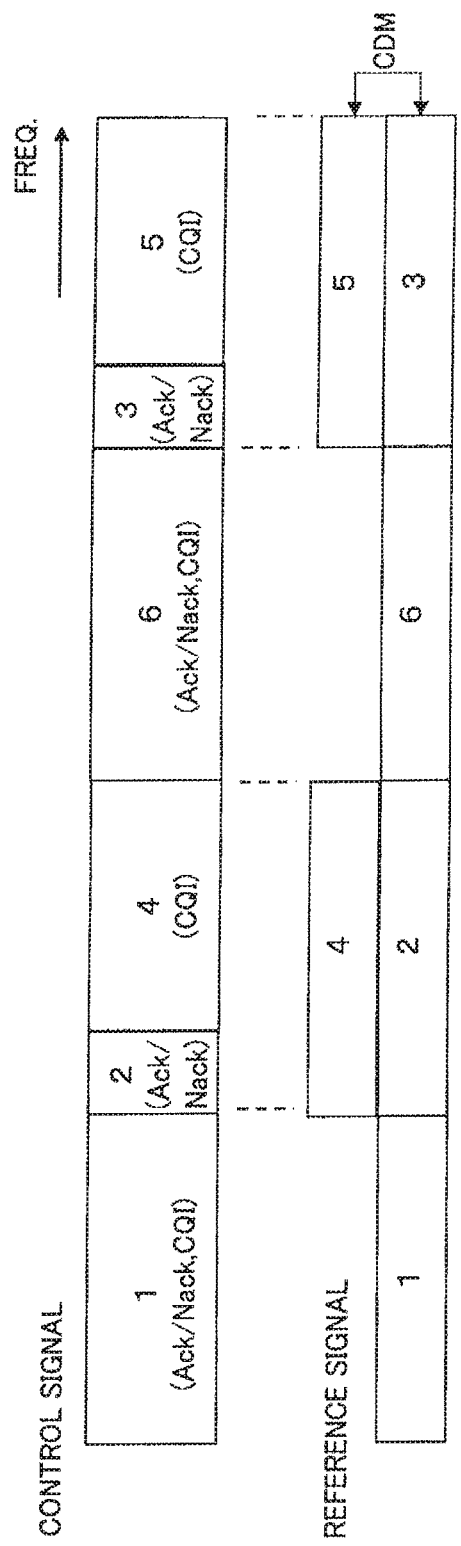
FIG. 11 is a diagram showing an example of the allocation of resources for control and reference signals according to the second exemplary embodiment of the present invention.

FIG. 11 is a diagram showing an example of the allocation of resources for control and reference signals according to the second exemplary embodiment of the present invention. Here, it is assumed that control and reference signals are multiplexed by time division multiplexing (TDM), and that in each sub-frame, data and control signals are transmitted in long blocks (LB) and reference signals are transmitted in short blocks (SB), as shown in FIG. 1A for example.

In the present example, a bandwidth used when one channel of Ack/Nack and one channel of CQI are transmitted is supposed to be a unit bandwidth used to multiplex reference signals by CDM. Specifically, a UE transmitting Ack/Nack only and a UE transmitting CQI only are multiplexed by LFDM over the total bandwidth of Ack/Nack and CQI, and a UE transmitting both of Ack/Nack and CQI is independently allocated the total bandwidth of Ack/Nack and CQI.

More specifically, referring to FIG. 11, UEs 1 and 6 are those transmitting both of Ack/Nack and CQI. Each of their control signals is transmitted by single-carrier transmission in a continuous band as is done conventionally, and their corresponding reference signals are transmitted over the bandwidths corresponding to Ack/Nack and CQI, respectively. In this case, the reference signal for demodulating the control signal does not particularly need to be multiplexed by CDM.

On the other hand, a UE 2, which transmits Ack/Nack only, and a UE 4, which transmits CQI only, are multiplexed by LFDM in adjacent bands, and reference signals of the UEs 2 and 4 are multiplexed by CDM over the total bandwidth of Ack/Nack and CQI. For a UE 3, which transmits Ack/Nack only, and a UE 5, which transmits CQI only, multiplexing is performed as in the case of the UEs 2 and 4.

According to the present example, for the UEs 2 and 3, which transmit Ack/Nack only, the reference signals are transmitted using the total bandwidth of Ack/Nack and CQI. Therefore, unlike the examples of the related arts, it is possible to avoid a reduction in the CAZAC sequence length.

Note that although control and data signals are multiplexed by TDM in the present example, the resource allocation of the present example is similarly applicable in the case where control and data signals are multiplexed by FDM.

5.2) Example 4

Figure 12:
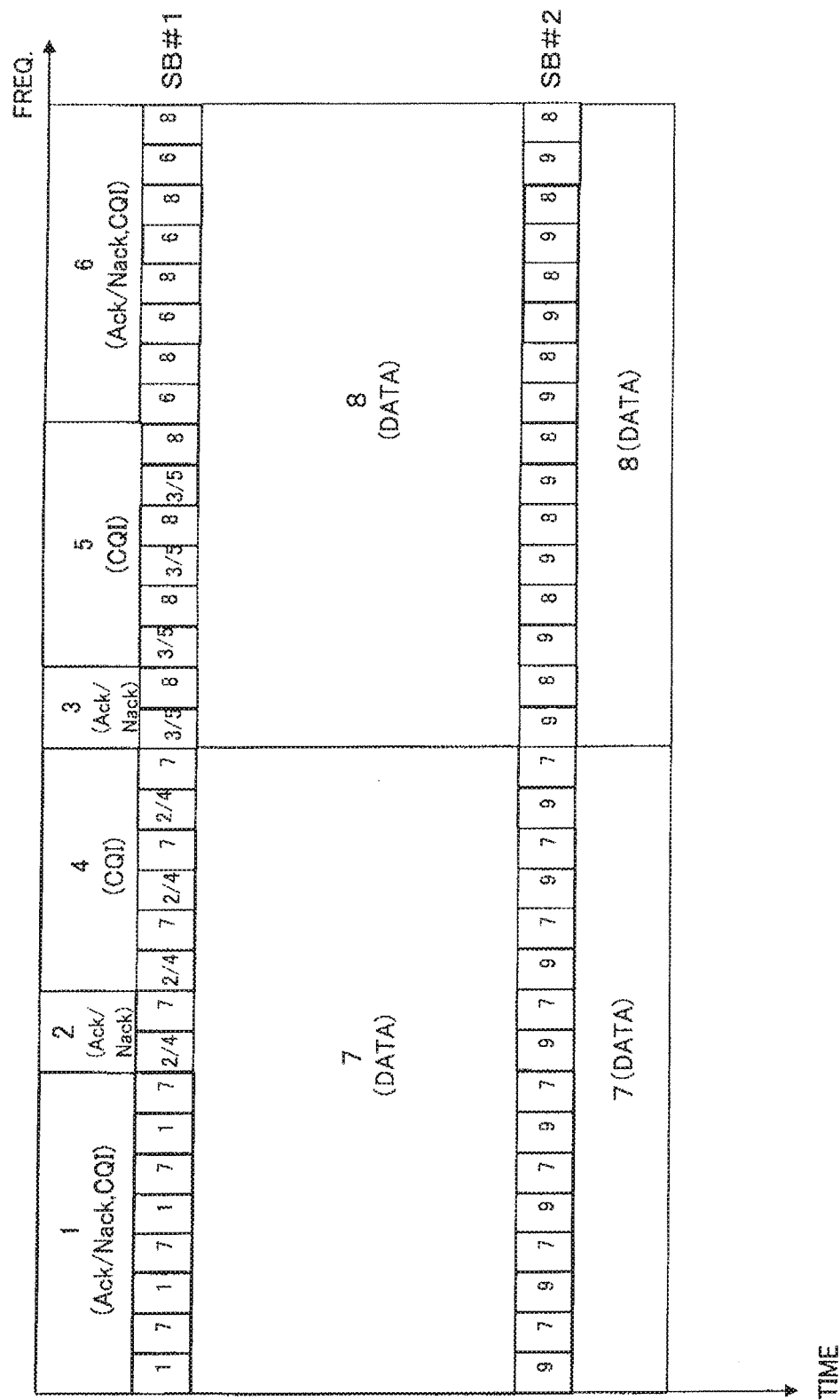
FIG. 12 is a diagram showing another example of the allocation of resources for control and reference signals according to the second exemplary embodiment of the present invention.

FIG. 12 is a diagram showing another example of the allocation of resources for control and reference signals according to the second exemplary embodiment of the present invention. Here, it is assumed that in each sub-frame, Ack/Nack and/or CQI, which are control signals, are transmitted in a long block LB#1, reference signals are transmitted in short blocks SB#1 and SB#2, and data signals are transmitted in long blocks LB#2 to LB#6, as shown in the LTE's uplink frame format in FIG. 3.

When a data signal is transmitted in long blocks LB#2 to LB#6, a reference signal for demodulating the data signal is transmitted in each of short blocks SB#1 and SB#2. According to the present example, in the short block SB#1, a reference signal of a UE 7, which transmits data, is multiplexed by DFDM with, for example, reference signals for control signals for UEs 2 and 4 that are multiplexed by CDM (the hybrid of FDM and CDM). In the short block SB#2, a reference signal of the UE 7 is multiplexed by DFDM with a reference signal for CQI measurement of a UE 9.

Reference signals of UEs 1 to 6, which transmit control signals only, are multiplexed as described earlier. Specifically, a reference signal of the UE 1, which transmits both of Ack/Nack and CQI, is transmitted over a total bandwidth corresponding to both Ack/Nack and CQI, without being code-division-multiplexed. The UE 2, which transmits Ack/Nack only, and the UE 4, which transmits CQI only, are multiplexed by LFDM in adjacent bands, and reference signals of the UEs 2 and 4 are multiplexed by CDM over the total bandwidth corresponding to both Ack/Nack and CQI. The UE 3, which transmits Ack/Nack only, and the UE 5, which transmits CQI only, are multiplexed similarly to the UEs 2 and 4.

Note that although control and data signals are multiplexed by TDM in the present example, the resource allocation of the present example is similarly applicable in the case where control and data signals are multiplexed by FDM.

5.3) Advantages

According to the second exemplary embodiment of the present invention, reference signals of multiple UEs whose control signals are multiplexed by LFDM are multiplexed by CDM over the total bandwidth of the LFDM control signals, whereby it is possible to avoid a reduction in the CAZAC sequence length. Additionally, the CAZAC sequence length can be made constant.

6. Third Exemplary Embodiment

According to the third exemplary embodiment of the present invention, control signals for multiple UEs are grouped and multiplexed by LFDM; among thus formed groups, one or more control signals in those groups having the same bandwidth are multiplexed by DFDM; reference signals of the UEs whose control signals are multiplexed by DFDM are multiplexed by CDM over the total bandwidth of the DFDM control signals.

In other words, among multiple types of control information having different amounts of information (here, "Ack/Nack" and "CQI"), one type or multiple types of control information (here, any one or both of "Ack/Nack" and "CQI") is selected for each UE; a bandwidth according to the amount of the selected information is allocated to each UE; control signals for $M_i$ UEs ($1 \leq M_i \leq N$, $1 \leq i \leq I$, $M_1+M_2+ \ldots +M_I=N$) are multiplexed by LFDM, regardless of the respective bandwidths allocated to the UEs. Among I groups thus formed, G groups having the same bandwidth are selected; control signals for those UEs belonging to each of the G groups are multiplexed by DFDM; reference signals of the UEs belonging to a corresponding one of the G groups are multiplexed by CDM in a reference resource having the total bandwidth of the control signals for the UEs belonging to the corresponding one of the G groups.

According to the present embodiment, in the case where control signals have three types of transmission bandwidths (a bandwidth for transmitting Ack/Nack only, a bandwidth for transmitting CQI only, and a bandwidth for transmitting both of Ack/Nack and CQI), a UE transmitting Ack/Nack only, a UE transmitting CQI only, and a UE transmitting both of Ack/Nack and CQI are multiplexed by LFDM and DFDM in a bandwidth obtained by grouping as described above.

6.1) Example 5

Figure 13:
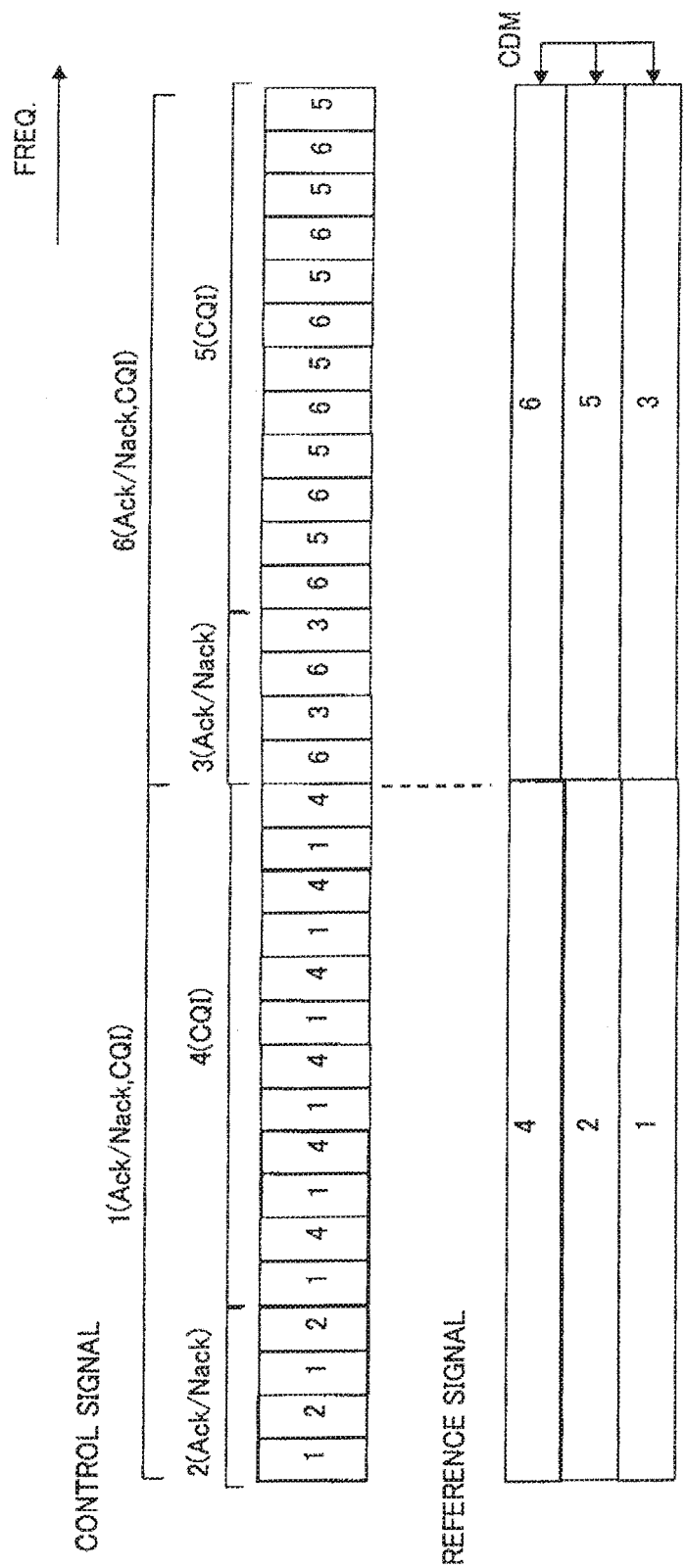
FIG. 13 is a diagram showing an example of the allocation of resources for control and reference signals according to the third exemplary embodiment of the present invention.

FIG. 13 is a diagram showing an example of the allocation of resources for control and reference signals according to the third exemplary embodiment of the present invention. Here, it is assumed that control and reference signals are multiplexed by time division multiplexing (TDM), and that in each sub-frame, data and control signals are transmitted in long blocks (LB) and reference signals are transmitted in short blocks (SB), as shown in FIG. 1A for example.

In the present example, the total of a bandwidth used to transmit Ack/Nack of two UEs and a bandwidth used to transmit CQI of two UEs, is supposed to be a unit bandwidth over which reference signals are multiplexed by CDM. Specifically, referring to FIG. 13, a UE 2, which transmits Ack/Nack only, and a UE 4, which transmits CQI only, are multiplexed by LFDM as in the second exemplary embodiment, and a control signal for a UE 1, which contains both of Ack/Nack and CQI and has the same bandwidth as the total bandwidth of the LFDM control signals for the UEs 2 and 4, is multiplexed with the LFDM control signals by DFDM with a repetition factor of 2. Accordingly, with respect to corresponding reference signals used for demodulation, the three UEs are multiplexed by CDM over the entire bandwidth in which the control signals for the UEs 1, 2, and 4 are multiplexed by DFDM.

Similarly, a UE 3, which transmits Ack/Nack only, and a UE 5, which transmits CQI only, are multiplexed by LFDM, and the UEs 3 and 5 are further multiplexed with a UE 6, which transmits both of Ack/Nack and CQI, by DFDM with a repetition factor of 2. Accordingly, with respect to reference signals of the UEs 3, 5, and 6, the three UEs are multiplexed by CDM over the entire bandwidth in which their control signals are multiplexed by DFDM.

According to the present example, even the reference signals of the UEs 2 and 3, which transmit Ack/Nack only, are transmitted over a bandwidth that is twice as wide as the total bandwidth of Ack/Nack and CQI. Accordingly, it is possible to achieve a CAZAC sequence length that is twice as long as the length according to the example shown in FIG. 9. However, the number of the reference signals multiplexed by CDM is larger than in the second exemplary embodiment.

6.2) Example 6

Figure 14:
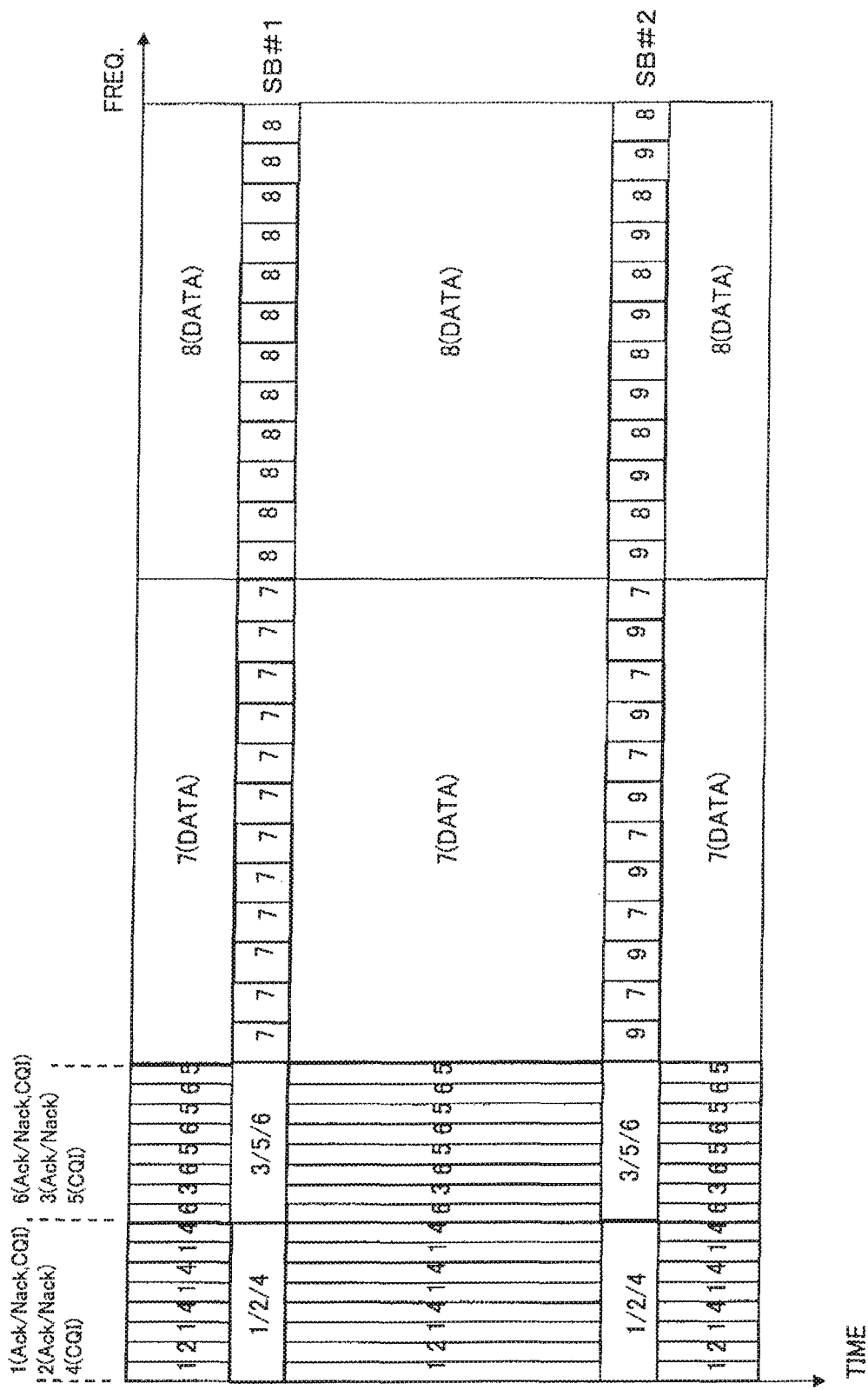
FIG. 14 is a diagram showing another example of the allocation of resources for control and reference signals according to the third exemplary embodiment of the present invention.

FIG. 14 is a diagram showing another example of the allocation of resources for control and reference signals according to the third exemplary embodiment of the present invention. Shown here is the case where, in a LTE's uplink frame format as shown in FIG. 3, control signals and data signals are multiplexed by frequency division multiplexing (FDM), and their respective transmission bands are completely divided. In the band where control signals are transmitted, Ack/Nack and/or CQI are transmitted in long blocks, and reference signals are transmitted in short blocks.

Referring to FIG. 14, in short blocks SB#1 and SB#2, reference signals of UEs 1 to 6, which transmit control signals only, are appropriately multiplexed by CDM, using a bandwidth corresponding to Ack/Nack and CQI in double. Specifically, the UE 2, which transmits Ack/Nack only, and the UE 4, which transmits CQI only, are multiplexed by LFDM, and their LFDM control signals are further multiplexed by DFDM with a control signal for the UE 1, which contains both of Ack/Nack and CQI and has the same bandwidth as the total bandwidth of the LFDM control signals. Accordingly, with respect to reference signals used to demodulate these control signals, the three UEs are multiplexed by CDM in the entire band where the control signals for the UEs 1, 2, and 4 are multiplexed by DFDM. Control and reference signals of the UEs 3, 5, and 6 are similarly multiplexed.

On the other hand, in the band where data signals are transmitted, data signals are transmitted in long blocks, and reference signals are transmitted in short blocks. Referring to FIG. 14, reference signals for UEs 7 and 8, which transmit data signals, individually occupy their respective bands in the short block SB#1, and are multiplexed by DFDM with a reference signal for CQI measurement of a UE 9 in the short block SB#2.

Note that although control and data signals are multiplexed by FDM in the present example, the resource allocation of the present example is similarly applicable in the case where control and data signals are multiplexed by TDM.

6.3) Advantages

According to the third exemplary embodiment of the present invention, control signals for multiple UEs are multiplexed by LFDM. Further, LFDM control signals having the same total bandwidth are multiplexed by DFDM. Their corresponding reference signals are multiplexed by CDM over the entire bandwidth in which the control signals are multiplexed by LFDM and DFDM. Thereby, the CAZAC sequence length can be increased. Moreover, since DFDM is used to multiplex control signals, the characteristics of the control signals can be enhanced by the effect of frequency diversity, in comparison with the above-described second exemplary embodiment.

Note that although the above-described embodiments are premised on the application to LTE, the application of the present invention is not limited to LTE. The present invention can be applied to any systems in general that use FDM as an access method.

7. Advantages of 2nd and 3rd Exemplary Embodiments

Tables 1 and 2 show the numbers of usable CAZAC sequences in the cases where control and data signals are multiplexed by TDM and by FDM. In the case of TDM, the multiplexing scheme according to the second exemplary embodiment is used. In the case of FDM, any one of the multiplexing schemes according to the second and third exemplary embodiments is used. Here, two options CQI size are assumed.

TABLE I

|  |  | Number of subcarriers in control signal/LB | CAZAC sequence length | Number of usable CAZAC sequences | Bandwidth of reference signal (kHz) |
|---|---|---|---|---|---|
| Conventional | TDM | 6/44/50 | 1/11/11 | 0/10/10 | 30/330/330 |
| Example | FDM | 1/7/8 | 1/3/4 | 0/2/2 | 30/90/120 |
| Present | TDM | 50 | 11 | 10 | 330 |
| Invention | FDM | 16 | 7 | 6 | 210 |

TABLE II

|  |  | Number of subcarriers in control signal/LB | CAZAC sequence length | Number of usable CAZAC sequences | Bandwidth of reference signal (kHz) |
|---|---|---|---|---|---|
| Conventional | TDM | 6/30/36 | 1/7/9 | 0/6/6 | 30/210/270 |
| Example | FDM | 1/5/6 | 1/2/3 | 0/1/2 | 30/60/90 |
| Present | TDM | 36 | 9 | 6 | 270 |
| Invention | FDM | 12 | 5 | 4 | 150 |

In the examples shown in Table 1, it is assumed that Acks/Nacks and/or CQIs for six UEs are multiplexed in a sub-frame within 5 MHz. In this case, six subcarriers are used for Ack/Nack, and 44 subcarriers are used for CQI.

In the examples shown in Table 2, it is assumed that Acks/Nacks and/or CQIs for eight UEs are multiplexed in a sub-frame within 5 MHz. In this case, six subcarriers are used for Ack/Nack, and 30 subcarriers are used for CQI.

Moreover, in these examples shown in Tables 1 and 2, one channel of Ack/Nack and one channel of CQI are grouped in the case of TDM, and two channels of Ack/Nack and two channels of CQI are grouped in the case of FDM. Additionally, in these tables, the values delimited with slashes (/) in each row and each column of "Conventional Example" show the respective results in the cases of "UE transmitting Ack/Nack only/UE transmitting CQI only/UE transmitting both of Ack/Nack and CQI."

It can be seen that by the application of the present invention, the numbers of usable CAZAC sequences are increased from the numbers achieved in the conventional example. Taking account of the maximum number of UEs that can be multiplexed by CDM, six to ten CAZAC sequences can be used in the case of TDM, and four to six CAZAC sequences can be used in the case of FDM.

8. Various Aspects

As described before, the object of the present invention is to provide a multiplexing method and a resource allocation method that can ensure the number of code sequences for reference signals used to demodulate control signals.

According to the present invention, reference signals for a plurality of mobile stations are multiplexed by CDM (code-division multiplexing) over the same bandwidth as that of grouped control signals for the mobile stations. Resource allocation is performed by grouping together control resources used for the control signals; and allocating reference signal each corresponding to the control signals in a reference resource equal to the same bandwidth as that of the grouped control resources.

According to another aspect of the present invention, a multiplexing method includes: grouping together a control signal for each mobile station; multiplexing grouped control signals by FDM (frequency division multiplexing); and when the grouped control signals are associated with a plurality of mobile stations, multiplexing reference signals for the plurality of mobile stations by CDM over a same bandwidth as a transmission bandwidth of the grouped control signals.

According to still another aspect of the present invention, a multiplexing method includes: multiplexing control signals for N mobile stations by FDM in a control resource; grouping together control signals for $M_i$ mobile stations ($1 \leq M_i \leq N$, $1 \leq i \leq I$, $M_1+M_2+\ldots+M_I=N$) such that their bands are adjacent in frequency domain, to generate I groups ($1 \leq I \leq N$); and multiplexing reference signals for the $M_i$ mobile stations by CDM in a reference resource having a bandwidth equal to a bandwidth of each of the I groups.

More specifically, CAZAC (Constant Amplitude Zero Auto-Correlation) sequence is used as the reference signal and a value of $M_i$ is selected so as to satisfy a condition such that a bandwidth of grouped control signals for the $M_i$ mobile stations is not smaller than a bandwidth corresponding to a predetermined reference sequence length. For example, considering the case of 3-sector/3-cell repetition system, 9 CAZAC sequences are needed and therefore a reference signal length is 11 at the minimum to ensure the 9 CAZAC sequences. Considering the case of 3-sector/4-cell repetition system, 12 CAZAC sequences are needed and therefore a reference signal length is 13 at the minimum to ensure the 13 CAZAC sequences. Assuming that a reference signal is transmitted in a short block SB (sub-carrier interval=30 kHz), the respective transmission bandwidths are 330 kHz and 390 kHz.

According to an exemplary embodiment of the present invention, each of the control signals has a bandwidth that is allocated depending on one or more type of control information selected for each mobile station from a plurality of types of control information having different amounts of information. Among bandwidths each allocated to the mobile stations, the control signals for $M_i$ mobile stations having the same transmission bandwidth are multiplexed by Distributed FDM and the reference signals for the $M_i$ mobile stations are multiplexed by CDM in a reference resource having a bandwidth equal to a bandwidth of each of the I groups each composed of grouped control signals for the $M_i$ mobile stations.

According to another exemplary embodiment of the present invention, control signals for $M_i$ mobile stations ($1 \leq M_i \leq N$, $1 \leq i \leq I$, $M_1 + M_2 + \ldots + M_I = N$) are multiplexed by Localized FDM regardless of bandwidths each allocated to the mobile stations, to generate I groups ($1 \leq I \leq N$); control signals in each of G groups (($1 \leq G \leq I$) are multiplexed by Distributed FDM, wherein the G groups are obtained by grouping ones of the I groups having a same bandwidth; and reference signals for mobile stations belonging to each of the G groups are multiplexed by CDM in a reference resource having a bandwidth equal to a total bandwidth of control signals for the mobile stations belonging to a corresponding one of the G groups.

Preferably, in a frame where a plurality of long blocks and short blocks are multiplexed by time division multiplexing, a control resource used for the control signals may be allocated long blocks and a reference resource is allocated short blocks.

According to the present invention, reference signals of multiple UEs are multiplexed by CDM using the total bandwidth of grouped control signals for the multiple UEs. Thereby, even if a control signal having a small transmission bandwidth (such as Ack/Nack, for example) is transmitted, the length of a CAZAC sequence used as a reference signal for control signal demodulation can be made long. Thus, it is possible to ensure the number of code sequences for reference signals used to demodulate control signals. Accordingly, in a cellular system for example, it is possible to simplify the cell designing with respect to uplink reference signals.

The present invention can be applied to mobile communications systems employing a scheme of transmitting control signals and corresponding reference signals, and systems including base and mobile stations.

The present invention may be embodied in other specific forms without departing from the spirit or essential characteristics thereof. The above-described exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A mobile station comprising:
a transceiver; and
at least one hardware processor,
wherein the transceiver is configured to receive, from a base station, a first resource allocation information indicating resource of a first control signal and resource of a first reference signal;
wherein the processor is configured:
to Fourier transform the first control signal;
to map the Fourier transformed first control signal such that the first control signal and a second control signal are multiplexed within a first transmission bandwidth, wherein the second control signal is transmitted based on a second resource allocation information to a base station;
to inverse Fourier transform the mapped first control signal;
to generate a first reference signal sequence, wherein the first reference signal sequence has a sequence length corresponding to an amount of all subcarriers included in the first transmission bandwidth;
to map the generated first reference signal sequence to at least one first physical resource within the first transmission bandwidth; and
to inverse Fourier transform the mapped first reference signal;
wherein the transceiver is further configured:
to transmit the inverse Fourier transformed first control signal to the base station in a first transmission interval; and
to transmit the inverse Fourier transformed first reference signal to the base station in a second transmission interval.

2. The mobile station according to claim 1, wherein a second reference signal sequence is mapped to the at least one first physical resource within the first bandwidth.

3. The mobile station according to claim 2, wherein the second reference signal is transmitted based on the second resource allocation information in the second transmission interval.

4. The mobile station according to claim 1, wherein the first reference signal sequence is generated based on a first cyclic shift.

5. The mobile station according to claim 3, wherein the second reference signal sequence is generated based on a second cyclic shift.

6. The mobile station according to claim 5, wherein a value of the second cyclic shift is determined based on the second resource allocation information.

7. The mobile station according to claim 4, wherein a value of the first cyclic shift is determined based on the first resource allocation information.

8. The mobile station according to claim 2, wherein the first reference signal sequence is multiplexed with the second reference signal sequence.

9. The mobile station according to claim 1, wherein the at least one first physical resource is the all subcarriers included in the first transmission bandwidth.

10. The mobile station according to claim 1, wherein the first resource allocation information is for the mobile station.

11. The mobile station according to claim 1, wherein the second resource allocation information is for another mobile station.

12. The mobile station according to claim 1, wherein a subframe includes the second transmission interval twice and the first transmission interval for a plurality of times, two of the second transmission intervals and a plurality of the first transmission intervals are included in a subframe.

13. The mobile station according to claim 1, wherein, the first reference signal sequence and the second reference signal sequence are generated by using Constant Amplitude Zero Auto-Correlation (CAZAC) sequences.

14. The mobile station according to claim 1, wherein the first reference signal is for demodulating the first control signal.

15. The mobile station according to claim 1, wherein the multiplexing of the first and second control signals within the first bandwidth comprises transmitting the first and the second control signals in the first bandwidth concurrently.

16. A base station comprising:
a transceiver; and
at least one hardware processor,
wherein the transceiver is configured:
to transmit, to a first mobile station, a first resource allocation information indicating resource of a first control signal and resource of a first reference signal;

to receive the first control signal in a first transmission interval; and to receive the first reference signal in a second transmission interval;

wherein the processor is configured to demodulate the received first control signal by using the received first reference signal;

wherein the first control signal is Fourier transformed;

wherein the first control signal is mapped such that the first control signal and a second control signal are multiplexed within a first transmission bandwidth, wherein the second control signal is transmitted based on a second resource allocation information;

wherein the first control signal is inverse Fourier transformed;

wherein the first control signal is transmitted by the first mobile station;

wherein the first reference signal is generated from a first reference signal sequence, wherein the first reference signal sequence has a sequence length corresponding to an amount of all subcarriers included in the first transmission bandwidth;

wherein the first reference signal is mapped to at least one first physical resource within the first transmission bandwidth;

wherein the first reference signal is inverse Fourier transformed the mapped first reference signal;

wherein the first reference signal is transmitted by the first mobile station.

17. The base station according to claim 16, wherein a second reference signal sequence is mapped to the at least one first physical resource within the first bandwidth.

18. The base station according to claim 17, wherein the second reference signal is transmitted based on the second resource allocation information in the second transmission interval.

19. The mobile station according to claim 16, wherein the first reference signal sequence is generated based on a first cyclic shift.

20. The base station according to claim 17, wherein the second reference signal sequence is generated based on a second cyclic shift.

21. The base station according to claim 20, wherein a value of the second cyclic shift is determined based on the second resource allocation information.

22. The base station according to claim 19, wherein a value of the first cyclic shift is determined based on the first resource allocation information.

23. The base station according to claim 17, wherein the first reference signal sequence is multiplexed with the second reference signal sequence.

24. The base station according to claim 16, wherein the at least one first physical resource is the all subcarriers included in the first transmission bandwidth.

25. The base station according to claim 16, wherein the first resource allocation information is for the first mobile station.

26. The base station according to claim 16, wherein the second resource allocation information is for a second mobile station.

27. The base station according to claim 16, wherein a subframe includes the second transmission interval twice and the first transmission interval for a plurality of times, two of the second transmission intervals and a plurality of the first transmission intervals are included in a subframe.

28. The base station according to claim 16, wherein the first reference signal sequence and the second reference signal sequence are generated by using Constant Amplitude Zero Auto-Correlation (CAZAC) sequences.

29. The base station according to claim 16, wherein the multiplexing of the first and second control signals within the first bandwidth comprises transmitting the first and the second control signals in the first bandwidth concurrently.

30. A communication method implemented in a mobile station, the communication method comprising:

receiving, from a base station, a first resource allocation information indicating resource of a first control signal and resource of a first reference signal;

Fourier transforming the first control signal;

mapping the Fourier transformed first control signal such that the first control signal and a second control signal are multiplexed within a first transmission bandwidth, wherein the second control signal is transmitted based on a second resource allocation information to a base station;

inverse Fourier transforming the mapped first control signal;

generating a first reference signal sequence, wherein the first reference signal sequence has a sequence length corresponding to an amount of all subcarriers included in the first transmission bandwidth;

mapping the generated first reference signal sequence to at least one first physical resource within the first transmission bandwidth;

inverse Fourier transforming the mapped first reference signal;

transmitting the inverse Fourier transformed first control signal to the base station in a first transmission interval; and transmitting the inverse Fourier transformed first reference signal to the base station in a second transmission interval.

31. The communication method according to claim 30, wherein a second reference signal sequence is mapped to the at least one first physical resource within the first bandwidth.

32. The communication method according to claim 31, wherein the second reference signal is transmitted based on the second resource allocation information in the second transmission interval.

33. The communication method according to claim 30, wherein the first reference signal sequence is generated based on a first cyclic shift.

34. The communication method according to claim 32, wherein the second reference signal sequence is generated based on a second cyclic shift.

35. The communication method according to claim 34, wherein a value of the second cyclic shift is determined based on the second resource allocation information.

36. The communication method according to claim 33, wherein a value of the first cyclic shift is determined based on the first resource allocation information.

37. The communication method according to claim 31, wherein the first reference signal sequence is multiplexed with the second reference signal sequence.

38. The communication method according to claim 30, wherein the at least one first physical resource is the all subcarriers included in the first transmission bandwidth.

39. The communication method according to claim 30, wherein the first resource allocation information is for the mobile station.

40. The communication method according to claim 30, wherein the second resource allocation information is for another mobile station.

41. The communication method according to claim 30, wherein a subframe includes the second transmission interval twice and the first transmission interval for a plurality of times, two of the second transmission intervals and a plurality of the first transmission intervals are included in a subframe.

42. The communication method according to claim 30, wherein, the first reference signal sequence and the second reference signal sequence are generated by using Constant Amplitude Zero Auto-Correlation (CAZAC) sequences.

43. The communication method according to claim 30, wherein the first reference signal is for demodulating the first control signal.

44. The communication method according to claim 30, wherein the multiplexing of the first and second control signals within the first bandwidth comprises transmitting the first and the second control signals in the first bandwidth concurrently.

45. A communication method implemented in a base station, the communication method comprising:
 transmitting, to a first mobile station, a first resource allocation information indicating resource of a first control signal and resource of a first reference signal;
 receiving the first control signal in a first transmission interval;
 receiving the first reference signal in a second transmission interval; and
 demodulating the received first control signal by using the received first reference signal;
 wherein the first control signal is:
  Fourier transformed;
  mapped such that the first control signal and a second control signal are multiplexed within a first transmission bandwidth, wherein the second control signal is transmitted based on a second resource allocation information;
  inverse Fourier transformed; and
  transmitted by the first mobile station;
 wherein the first reference signal is:
  generated from a first reference signal sequence, wherein the first reference signal sequence has a sequence length corresponding to an amount of all subcarriers included in the first transmission bandwidth;
  mapped to at least one first physical resource within the first transmission bandwidth;
  inverse Fourier transformed the mapped first reference signal; and
  transmitted by the first mobile station.

46. The communication method according to claim 45, wherein a second reference signal sequence is mapped to the at least one first physical resource within the first bandwidth.

47. The communication method according to claim 46, wherein the second reference signal is transmitted based on the second resource allocation information in the second transmission interval.

48. The communication method according to claim 45, wherein the first reference signal sequence is generated based on a first cyclic shift.

49. The communication method according to claim 46, wherein the second reference signal sequence is generated based on a second cyclic shift.

50. The communication method according to claim 49, wherein a value of the second cyclic shift is determined based on the second resource allocation information.

51. The communication method according to claim 48, wherein a value of the first cyclic shift is determined based on the first resource allocation information.

52. The communication method according to claim 46, wherein the first reference signal sequence is multiplexed with the second reference signal sequence.

53. The communication method according to claim 45, wherein the at least one first physical resource is the all subcarriers included in the first transmission bandwidth.

54. The communication method according to claim 45, wherein the first resource allocation information is for the first mobile station.

55. The communication method according to claim 45, wherein the second resource allocation information is for a second mobile station.

56. The communication method according to claim 45, wherein a subframe includes the second transmission interval twice and the first transmission interval for a plurality of times, two of the second transmission intervals and a plurality of the first transmission intervals are included in a subframe.

57. The communication method according to claim 45, wherein the first reference signal sequence and the second reference signal sequence are generated by using Constant Amplitude Zero Auto-Correlation (CAZAC) sequences.

58. The communication method according to claim 45, wherein the multiplexing of the first and second control signals within the first bandwidth comprises transmitting the first and the second control signals in the first bandwidth concurrently.

* * * * *